United States Patent
Mihota

(10) Patent No.: US 8,391,430 B2
(45) Date of Patent: Mar. 5, 2013

(54) COMMUNICATION DEVICE, COMMUNICATION METHOD, COMPUTER PROGRAM AND ADAPTIVE EQUALIZER

(75) Inventor: Norihito Mihota, Saitama (JP)

(73) Assignee: Sony Corporation, Tokyo (JP)

( * ) Notice: Subject to any disclaimer, the term of this patent is extended or adjusted under 35 U.S.C. 154(b) by 572 days.

(21) Appl. No.: 12/626,053

(22) Filed: Nov. 25, 2009

(65) Prior Publication Data

US 2010/0134256 A1 Jun. 3, 2010

(30) Foreign Application Priority Data

Dec. 2, 2008 (JP) ................................ 2008-307930

(51) Int. Cl.
*H04B 1/10* (2006.01)
(52) U.S. Cl. ........ 375/350; 375/316; 375/229; 375/232; 375/233
(58) Field of Classification Search .................. 375/350, 375/316, 229, 232, 233
See application file for complete search history.

(56) References Cited

U.S. PATENT DOCUMENTS

| 6,023,386 A * | 2/2000 | Reed et al. ........................ 360/51 |
| 2007/0025006 A1* | 2/2007 | Ichihara .......................... 360/31 |

FOREIGN PATENT DOCUMENTS

| JP | 2000-295148 | 10/2000 |
| JP | 2002-158722 | 5/2002 |
| JP | 2003-115786 | 4/2003 |
| JP | 2003-283384 | 10/2003 |
| JP | 2004-064681 | 2/2004 |
| JP | 2005-168069 | 6/2005 |
| JP | 2008-017012 | 1/2008 |
| JP | 2008-022422 | 1/2008 |
| JP | 2008-027270 | 2/2008 |

OTHER PUBLICATIONS

Japanese Office Action dated Nov. 30, 2010, for corresponding Japanese Patent Appln. No. 2008-307930.

* cited by examiner

*Primary Examiner* — Sam K Ahn
*Assistant Examiner* — Leila Malek
(74) *Attorney, Agent, or Firm* — K&L Gates LLP

(57) ABSTRACT

A communication device is provided for receiving a packet including a preamble part having a continuous waveform, a sync part having a specific pattern and a data part, which has been modulated by changing electrical load. The communication device includes: a preamble detection unit for detecting the preamble part from a received signal to extract sampling timing based on the continuous waveform; a sync detection unit for detecting the sync part from the received signal based on the sampling timing to output a timing signal indicating a start position of the sync part; a delay buffer for giving a delay to the received signal so that the head of the sync part is not outputted until the detection of the sync part is determined; an adaptive equalization unit for performing adaptive equalization using the sync part based on the timing signal by inputting the delayed received signal; and a decoding unit for performing decoding processing of an equalized output signal from the adaptive equalization unit.

17 Claims, 11 Drawing Sheets

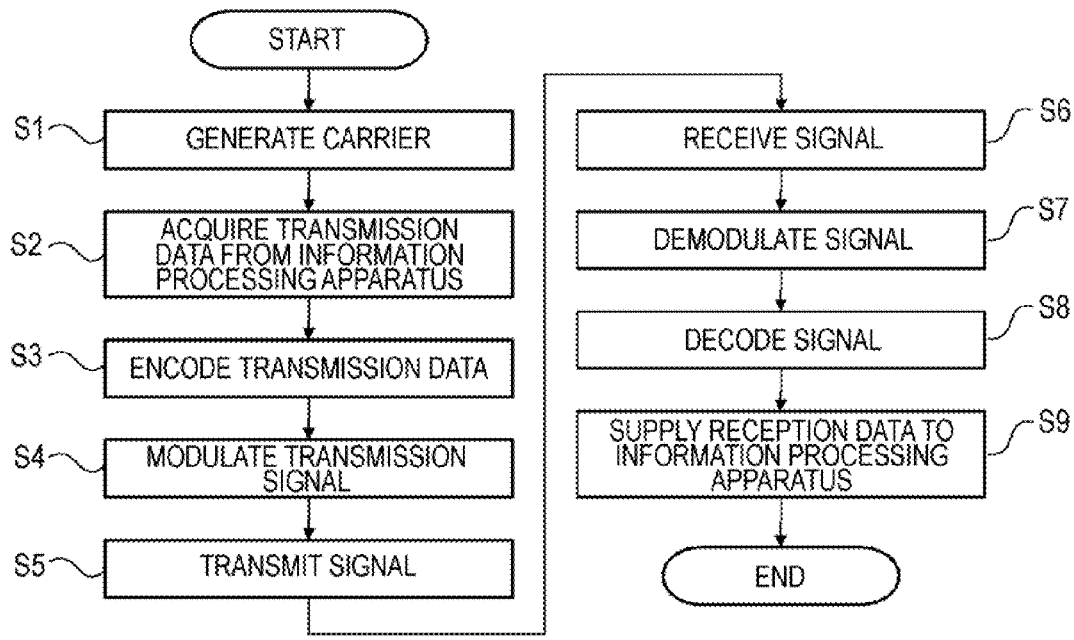
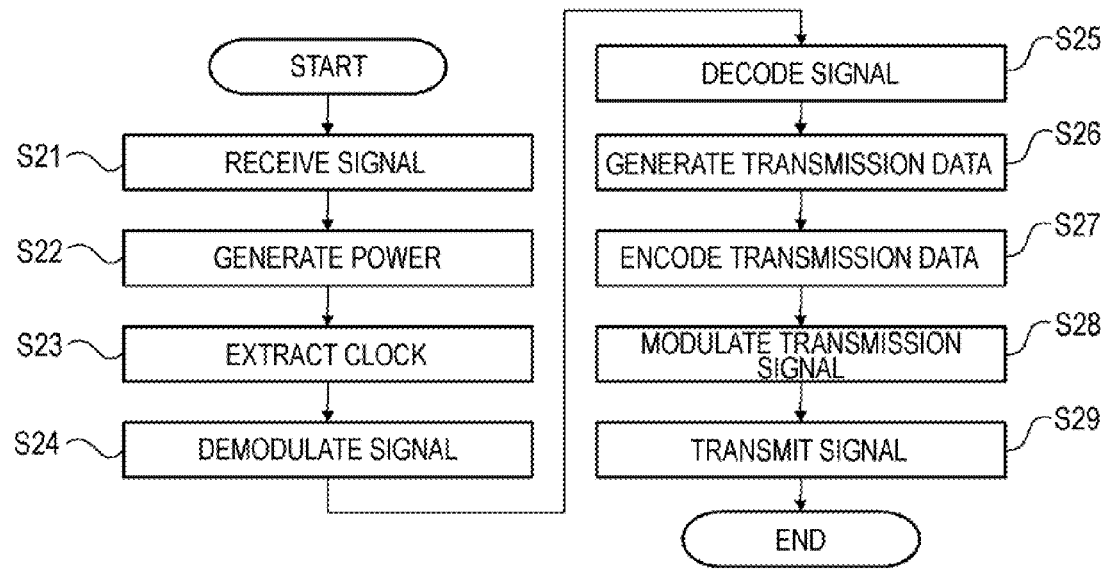

USE AS KNOWN SIGNAL SERIES FOR LEARNING

PRIOR ART

COMMUNICATION DEVICE, COMMUNICATION METHOD, COMPUTER PROGRAM AND ADAPTIVE EQUALIZER

CROSS REFERENCES TO RELATED APPLICATIONS

The present application claims priority to Japanese Priority Patent Application JP 2008-307930 filed in the Japan Patent Office on Dec. 2, 2008, the entire content of which is hereby incorporated by reference.

BACKGROUND

A contactless communication system called RFID (Radio Frequency Identification) is known as a communication system in which a communication terminal not having a generating source of radio waves for itself transmits data to a device to be the other party of communication by wireless. The RFID is also called as an ID system, a data carrier system and the like, however, the RFID system which is abbreviated as RFID is common worldwide. The RFID means an "identification system using a high frequency (radio wave)".

The RFID system is applied to various contactless IC cards. An IC card system includes an IC (Integrated Circuit) card as a transponder and a device performing reading information from the IC card or writing of information to the IC card (referred to as a "reader/writer" in the following description). Such IC card system is convenient because reading/writing of information is performed in a contactless manner between the IC card and the reader/writer. The reader/writer is a device which starts interactive communication by outputting an electromagnetic wave first (that is, the device which takes initiative of communication), which is also referred to as an "initiator". The transponder such as the IC card is a "target" which sends a response (interactive communication start response) with respect to a command (interactive communication start request) from the initiator. In a passive mode, a carrier signal is constantly directed from the initiator to the target, whereas in the active mode, the carrier signal is switched alternately. In the following description, communication from the reader/writer to the transponder will be called a "down link" and communication from the transponder to the reader/writer is called "uplink".

As contactless communication methods which can be applied to the RFID, an electrostatic method, an electromagnetic induction method, a radio wave communication method and the like can be cited. Among them, the electromagnetic induction method includes a primary coil on the reader/writer side and a secondary coil on the card (or the transponder) side, in which data communication is performed via the coils by magnetic coupling of these two coils. Specifically, the reader/writer transmits data by performing amplitude modulation on a magnetic field generated by the primary coil, and the transponder side detects the data. The transponder also performs modulation processing such as amplitude modulation by load switching (LS) of the secondary coil to thereby transmit data to the reader/writer. Each coil of the transponder and the reader/writer is operated as an LC resonant circuit, and the proper communication distance between the transponder and the reader/writer can be set by adjusting resonant frequencies of these coils to a carrier frequency used for communication to allow these coils to be resonant. In the following description, each coil of the transponder and the reader/writer is also referred to as an "antenna".

The RFID system is classified into three types: a close coupled type (higher than 0 and lower than 2 mm), a proximity type (higher than 0 and lower than 10 cm) and a vicinity type (higher than 0 and lower than 70 cm) according to the transmission distance, which are prescribed by international standards such as ISO/IEC15693, ISO/IEC14443 and ISO/IEC15693, respectively. Among them, as contactless-proximity type IC card standards complying with ISO/IEC14443, Type A, Type B and Felica (trademark of Sony Corporation) can be cited. Type A corresponds to Mifare (trademark) of Royal Phillips Electronics. The card and the reader/writer as SmartCard are standardized as IS07816.

Moreover, NFC (Near Field Communication) developed by Sony Corporation and Royal Phillips Electronics is an RFID standard prescribing specifications of an NFC communication device (reader/writer) which can communicate with respective IC cards of the above Type A, Type B and Felica mainly, which has become the international standard as ISO/IEC IS18092 on December 2003. The NFC communication system takes over "Felica" of Sony Corporation and "Mifare" of Royal Phillips Electronics which have been widely used as a contactless IC card originally, which realizes the proximity-type contactless interactive communication of approximately 10 cm by using 13.56 MHz band in the electromagnetic induction method (NFC prescribes passive communication between the reader/writer and the reader/writer in addition to the communication between the card and the reader/writer).

Presently, NFC is extensively used for individual authentication, electronic money payment and the like. For example, an NFC communication device having an active mode in addition to the passive mode is proposed (for example, refer to JP-A-2005-168069 (Patent Document 1)).

A transfer direction, communication speed, a modulation method and an encoding method according to the communication mode in an NFC IP-1 (interface and Protocol-1) standard are shown in the following chart 1.

TABLE 1

| Transfer direction | | A type | B type | Felica | |
|---|---|---|---|---|---|
| | | | speed communication | | |
| | | 106 kbps | 106 kbps | 212 kbps | 424 kbps |
| reader/writer ↓ card | carrier frequency modulation method encoding method | 13.56 MHz 100% ASK deformed mirror | 13.56 MHz 10% ASK NRZ | 13.56 MHz 8-30% ASK Manchester | |
| card ↓ reader/writer | subcarrier frequency modulation method encoding method | 13.56 MHz/ −16 load modulation Manchester | 13.56 MHz/ −16 load modulation BPSK-NRZ-L | — >12% ASK Manchester | |

In the electromagnetic-coupling type contactless communication specifications prescribed by ISO 18092, a Manchester code is used in Felica. In a Felica format, the same packet is used in downlink and uplink. In FIG. 15, a packet structure of the Felica format is shown. The shown packet includes three parts: "preamble", "sync" and "data". The preamble has a "0" series of the 6-byte length, the sync has a known series "0xB24D" of 2-byte. The data has LEN of 1-byte indicating the packet length, a data body (payload) of (LEN-1) byte length and a CRC (Cyclic Redundancy Check) code of 2-byte. All these three parts are Manchester encoded.

Here, in the Manchester encoding, when a binary value "0" is sent, the value is changed from the low level to the high level (change the input "0" to "01") at the center of a bit section, whereas, when a binary value "1" is sent, the value is changed from the high level to the low level (change the input "1" to "10") at the center of a bit section. In other words, one bit section is divided into a forward cell and a backward cell at the center, and when the forward cell is the low level as well as the backward cell is the high level, a logical value is set to "0" and when the forward cell is the high level and the backward cell is the low level, the logical value is set to "1" in this coding format. In the Manchester encoding, DC components of the transmission signal are cancelled by widening the signal to a double-wide band (converting input 1-bit to 2-bit).

In the preamble part, 6-byte "0" is Manchester encoded. Therefore, the part will be a continuous waveform in which "01" continues 48 times. The sync part has a pattern in which "0xB24D" is Manchester encoded. The data part is Manchester encoded by joining transmission information to Length information (LEN) and CRC.

In the receiving side of the packet, extraction of a clock (sampling timing) is performed based on the preamble part which is the continuous waveform. In the specification, the operation is referred to as "timing synchronization". Next, the sync part having the pattern in which "0xB24D" is Manchester encoded is detected to estimate a start position of the following data part. In the specification, the operation is referred to as "frame synchronization". Then, decoding of the data part is performed based on the start position.

In the Felica format, 424 kbps, 848 kbps, 1.7 Mbps, 3.4 Mbps and the like which are multiples of 212 kbps are prescribed as communication rates. As the communication rate is increased, the frequency band of a transmission signal is widened proportionally. As the frequency band of the signal is widened, effects of frequency characteristics in a channel, a transmission RF analog circuit and a reception RF analog circuit are increased. In the frequency characteristics, the attenuation is commonly increased as the frequency becomes higher. The disorder of phase characteristics are also increased as the frequency becomes higher. Accordingly, the higher the communication rate of the signal is, the more marked the disorder of the received waveform becomes.

As a method of compensating the disorder of a received signal in high-speed communication, adaptive equalization processing can be cited. An adaptive equalization circuit includes a FIR (Finite Impulse Response) filter and a learning circuit as an example. A structure of the FIR filter is schematically shown in FIG. 16. The FIR filter includes a delay line in which plural delay elements are connected in series, which weights time-series input data for the numbers of arranged delay elements by tap coefficients in accordance with characteristics of the filter by multipliers respectively, then, accumulates and averages the data to obtain an equivalent signal. After that, the tap coefficients of the filter are determined so that the equivalent signal outputted from the FIR filter comes close to a desired signal by referring to a known training signal (for example, refer to JP-A-2004-64681 (Patent Document 2) and JP-A-2008-22422 (Patent Document 3)).

For example, an RFID system which reduces skew in a radio-wave propagation path by applying an adaptive equalizer as well as reduces communication errors generated by the skew is proposed (refer to JP-A-2008-27270 (Patent Document 4).

In order to perform adaptive equalization, transmission of a random pattern series having the enough length for learning the tap coefficient of the FIR filter will be necessary. On the other hand, in order to decode the data part in the packet from the head, it is necessary to complete learning of the FIR filter in a stage previous to the transmission.

In order to complete the learning of the FIR filter before the data part is arrived, a method of inserting a random pattern which is sufficiently long for learning between the sync part and the data part, a method of transmitting a dedicated packet for learning before a normal packet and the like can be considered. However, in order to realize these methods, a packet format which is different from the Felica format prescribed by the NFC IP-1 standard is used, therefore, a problem concerning compatibility may occur. Since time for transmitting information is reduced for time of transmitting the random pattern for learning as a known signal, the communication rate is likely to be reduced.

In the case of the communication system performing data transmission by load modulation of an antenna such as the NFC communication, transient response characteristics may differ according to a change direction of electrical load (namely, a direction in which load resistance of the antenna is turned on from off and a direction in which it is turned off from on) when performing load modulation of the antenna. FIG. 17 shows amplitude variation of a demodulated signal (preamble part) obtained on the side of the other party of communication when load modulation is performed with respect to a carrier signal generated by the other party of communication. As shown in the drawing, a signal waveform is not symmetric at the rising edge and at the falling edge. Accordingly, it can be considered that it is difficult to obtain sufficient improvement of reception characteristics even when adaptive equalization using the normal FIR filter is performed.

It is desirable to provide an excellent communication device, a communication method, a computer program and an adaptive equalizer suitably capable of solving disorder of a received waveform caused by speeding-up of a communication rate by adaptive equalization.

It is further desirable to provide an excellent communication device, a communication method, a computer program and an adaptive equalizer capable of performing adaptive equalization of a received waveform while keeping compatibility of a packet format based on the NFC standard.

It is further desirable to provide an excellent communication device, a communication method, a computer program and an adaptive equalizer capable of improving reception characteristics by compensating disorder of a received waveform suitably by adaptive equalization in a contactless communication system using load modulation of an antenna even when difference occurs in transient response characteristics of the received-signal waveform according to a change direction of load.

SUMMARY

The present disclosure relates to a communication device, a communication method, a computer program and an adaptive equalizer in which communication operation is performed as a reader/writer (initiator) transmitting a request command or a transponder (target) sending a response command with respect to the request command in contactless communication, and particularly relates to a communication device, a communication method, a computer program and an adaptive equalizer in which contactless communication complying with a NFC (Near Field Communication) standard.

More particularly, the disclosure relates to a communication device, a communication method, a computer program and an adaptive equalizer which solve disorder of a received waveform caused by speeding-up of a communication rate by the adaptive equalization, and especially relates to a communication device, a communication method, a computer program and an adaptive equalizer performing the adaptive equalization of the received waveform while keeping compatibility of a packet format based on the NFC standard.

According to an embodiment, there is provided a communication device receiving a packet having a preamble part having a continuous waveform, a sync part having a specific pattern and a data part, which has been modulated by changing electrical load, which includes a preamble detection unit configured to detect the preamble part from a received signal to extract sampling timing based on the continuous waveform, a sync detection unit configured to detect the sync part from the received signal based on the sampling timing to output a timing signal indicating a start position of the sync part, a delay buffer configured to give delay to the received signal so that the head of the sync part is not outputted until the sync detection unit determines the detection of the sync part, an adaptive equalization unit configured to perform adaptive equalization using the sync part based on the timing signal by inputting the received signal delayed by the delay buffer, and a decoding unit configured to perform decoding processing of an equalized output signal from the adaptive equalization unit.

According to another embodiment, the adaptive equalization unit is a learning-type equalization circuit including a FIR (Finite Impulse Response) filter and a learning circuit, which adjusts tap coefficients of the FIR filter by comparing the received signal to a given reference signal based on the timing signal so that the difference there between is reduced.

According to still another embodiment, the adaptive equalization unit is a learning-type equalization circuit including a DFE (Decision Feedback Equalizer) and a learning circuit, which adjusts tap coefficients of the DFE by comparing the received signal to a given reference signal based on the timing signal so that the difference there between is reduced.

According to yet another embodiment, the learning circuit can apply, for example, any of learning algorithms of NLMS (Normalized Least Mean Square), LMS (Least Mean Square) and RLS (Recursive Least Square).

According to another embodiment, the adaptive equalization unit uses the last several symbols of the preamble part and the sync part at the same time.

According to a further embodiment, the learning circuit performs high-speed learning while permitting variation of error in the front half of the sync part as well as performs low-speed learning with small convergence error by suppressing variation of error in the last half of the sync part.

According to another embodiment, adaptive equalization unit stops learning at the timing when the data part following the sync part is outputted.

A communication device according to yet another embodiment further includes a data part reference signal generating unit generating a data part reference signal from a transmission waveform obtained from the data part equalized at the adaptive equalization unit, in which the adaptive equalization unit performs low-speed learning at the data part continuously by using the data unit reference signal.

According to a further embodiment, the data part reference signal generating unit can be configured as a temporary determination unit to which the data part equalized at the adaptive equalization unit is inputted and performs temporary determination of the transmission waveform based on a sign of the input signal. The adaptive equalization unit uses a temporary determination output from the temporary determination unit as a reference signal at the time of performing learning at the data part.

According to another embodiment, the data part reference signal generating unit is configured as a re-encoding unit which performs re-encoding of a decoded signal obtained by decoding the data part equalized at the adaptive equalization unit at the decoding unit. The adaptive equalization unit uses a signal series re-encoded at the re-encoding unit as a reference signal at the time of performing learning at the data part.

According to another embodiment, the above FIR filter includes a delay line in which plural delay elements having delay time corresponding to a sampling period respectively are connected in series, first multipliers performing multiplication of first type of tap coefficients corresponding to a first change direction of electrical load and second multipliers performing multiplication of second type of tap coefficients corresponding to a second change direction of electrical load respectively with respect to the transmission signal inputted to the delay line as well as time-series input data including output signals from respective delay elements of the delay line, selectors selecting any one of outputs from the first multipliers and the second multipliers by each input data according to the change direction (namely, positive/negative sign of input data) of electrical load, and an accumulator adding and averaging weighted time-series input data selected by the selectors to output an equalized signal. The learning circuit adjusts tap coefficients selected by the selectors so that the difference between the received signal and the reference signal is reduced.

According to another embodiment, the above DFE includes a feed forward delay line in which plural delay elements having delay time corresponding to a sampling period respectively, to which the transmission signal is inputted, are connected in series, a feedback delay line in which plural delay elements having delay time corresponding to a sampling period respectively, to which a reference signal for learning is inputted, first multipliers performing multiplication of first type of tap coefficients corresponding to a first change direction of electrical load and second multipliers performing multiplication of second type of tap coefficients corresponding to a second change direction of electrical load respectively with respect to the transmission signal and time-series input data including output signals of respective delay elements in the feed forward delay line as well as time-series feedback data having output signals of respective delay elements in the feedback delay line, and selectors selecting any one of outputs from the first multipliers and the second multipliers by each input data and feedback data according to the change direction (namely, positive/negative sign of input data or feedback data) of electrical load. The learning circuit adjusts tap coefficients selected by the selector so that the difference between the received signal and the reference signal is reduced.

According to another embodiment, there is provided a communication method receiving a packet including a preamble part having a continuous waveform, a sync part having a specific pattern and a data part, which have been modulated by changing electrical load, which has the steps of detecting the preamble part from a received signal and extracting sampling timing based on the continuous waveform, detecting the sync part from the received signal based on the sampling timing and outputting a timing signal indicating a start position of the sync part, giving and holding delay with respect to the received signal so that the head of the sync part is not outputted until the detection of the sync part is determined in the step of detecting the sync, performing adaptive equalization using the sync part based on the timing signal by inputting the received signal delayed by the delay holding step and performing decoding processing of an equalized output signal obtained by the adaptive equalization step.

According to another embodiment, there is provided a computer program written in a computer readable format so as to execute processing for receiving a packet including a preamble part having a continuous waveform, a sync part having a specific pattern and a data part, which have been modulated by changing electrical load, which allows the computer to function as a preamble detection unit configured to detect the preamble part from a received signal to extract sampling timing based on the continuous waveform, a sync detection unit configured to detect the sync part from the received signal based on the sampling timing to output a timing signal indicating a start position of the sync part, a delay buffer configured to give delay to the received signal so that the head of the sync part is not outputted until the sync detection unit determines the detection of the sync part, an adaptive equalization unit configured to perform adaptive equalization using the sync part based on the timing signal by inputting the received signal delayed by the delay buffer and a decoding unit configured to perform decoding processing of an equalized output signal from the adaptive equalization unit.

The computer program according to the above embodiment defines the computer program written in the computer readable format so as to realize prescribed processing on a computer. In other words, the computer program according to the embodiment is installed in a computer, thereby realizing cooperative operation on the computer, as a result, the same effects as the communication device according to the embodiment can be obtained.

According to another embodiment, there is provided an adaptive equalizer performing equalization processing of a transmission signal modulated by changing electrical load, which includes a delay line in which plural delay elements having delay time corresponding to a sampling period respectively are connected in series, first multipliers performing multiplication of first type of tap coefficients corresponding to a first change direction of electrical load and second multipliers performing multiplication of second type of tap coefficients corresponding to a second change direction of electrical load respectively with respect to the transmission signal inputted to the delay line as well as time-series input data including output signals from respective delay elements of the delay line, selectors selecting any one of outputs from the first multipliers and the second multipliers by each input data according to the change direction (namely, positive/negative sign of input data) of electrical load, an accumulator adding and averaging weighted time-series input data selected by the selectors to output an equalized signal and the learning circuit adjusting tap coefficients selected by the selectors so that the difference between the received signal and the reference signal is reduced.

According to another embodiment, there is provided an adaptive equalizer performing equalization processing of a transmission signal modulated by changing electrical load, which includes a feed forward delay line in which plural delay elements having delay time corresponding to a sampling period respectively to which the transmission signal is inputted are connected in series, a feedback delay line in which plural delay elements having delay time corresponding to a sampling period respectively to which a reference signal for learning is inputted, first multipliers performing multiplication of first type of tap coefficients corresponding to a first change direction of electrical load and second multipliers performing multiplication of second type of tap coefficients corresponding to a second change direction of electrical load respectively with respect to time-series input data including the transmission signal and output signals of respective delay elements in the feed forward delay line as well as time-series feedback data having output signals of respective delay elements in the feedback delay line, selectors selecting any one of outputs from the first multipliers and the second multipliers by each input data and feedback data according to the change direction (namely, positive/negative sign of input data or feedback data) of electrical load and the learning circuit adjusting tap coefficients selected by the selectors so that the difference between the received signal and the reference signal is reduced.

According to some embodiments, it is possible to provide an excellent communication device, a communication method, a computer program and an adaptive equalizer suitably capable of solving disorder of a received waveform caused by speeding-up of a communication rate by adaptive equalization.

According to some embodiments, it is further possible to provide an excellent communication device, a communication method, a computer program and an adaptive equalizer capable of performing adaptive equalization of a received waveform while keeping compatibility of a packet format based on the NFC standard.

According to some embodiments, it is further possible to provide an excellent communication device, a communication method, a computer program and an adaptive equalizer capable of improving reception characteristics by compensating disorder of a received waveform suitably by adaptive equalization in a contactless communication system using load modulation of an antenna even when difference occurs in transient response characteristics of the received-signal waveform according to a change direction of load.

According to some embodiments, for example, in the contactless communication system complying with the NEC IP-1 standard, the delay buffer is provided on the receiver (reader/writer) side using the prescribed packet format as it is, thereby realizing both frame synchronization using the sync part and adaptive equalization using the same sync part. Therefore, the compatibility problem and the overhead increase can be avoided.

Also according to some embodiments, the adaptive equalization unit uses the last several symbols of the preamble part and the sync part at the same time, thereby performing learning using a longer known signal series.

Also according to some embodiments, the learning circuit performs high-speed learning while permitting variation of error in the front half of the sync part as well as performs low-speed learning with small convergence error by suppressing variation of error in the last half of the sync part, thereby realizing learning of adaptive equalization with high-speed convergence and small convergence error on the whole.

Also, according to some embodiments, the learning in the adaptive equalization unit is stopped at the timing when the data part following the sync part is outputted, thereby executing equalization processing using the learned tap coefficient to the data part continuously.

Also, according to some embodiments, the transmission waveform obtained from the equalized data part is used as a reference signal and the learning is allowed to be continued also at the data part, thereby performing learning using a longer signal series.

In the case of performing equalization processing of the transmission signal modulated by changing electrical load, there is a case in which transient response characteristics may differ according to the change direction of electrical load (for example, a direction in which load resistance of the antenna is turned off from on and a direction in which it is turned on from off) and it is difficult to improve reception characteristics sufficiently by the normal adaptive equalization. According to some embodiments, adaptive equalization using the FIR filter or the DFE having different types of tap coefficients is performed, thereby realizing improvement of reception characteristics.

Additional features and advantages are described herein, and will be apparent from the following Detailed Description and the figures.

BRIEF DESCRIPTION OF THE FIGURES

FIG. 3 is a flowchart showing a processing procedure executed by the reader/writer at the time of performing data transmission/reception processing in the communication system shown in FIG. 1;

FIG. 4 is a flowchart showing a processing procedure executed by the transponder at the time of performing data transmission/reception processing in the communication system shown in FIG. 1;

DETAILED DESCRIPTION

Hereinafter, embodiments will be explained in detail with reference to the drawings.

Figure 1:
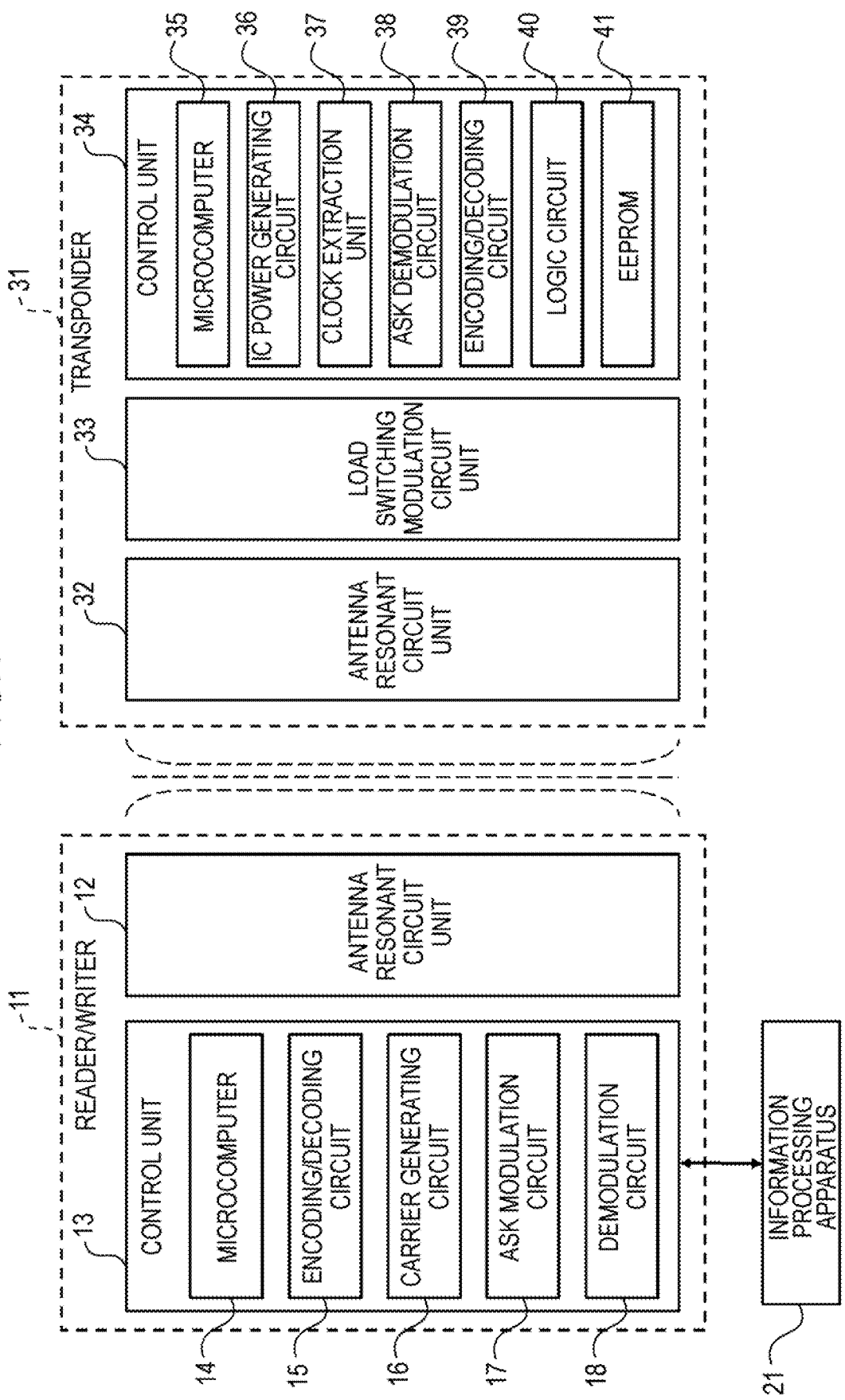
FIG. 1 is a diagram showing a configuration example of a communication system according to an embodiment.
Figure 2:
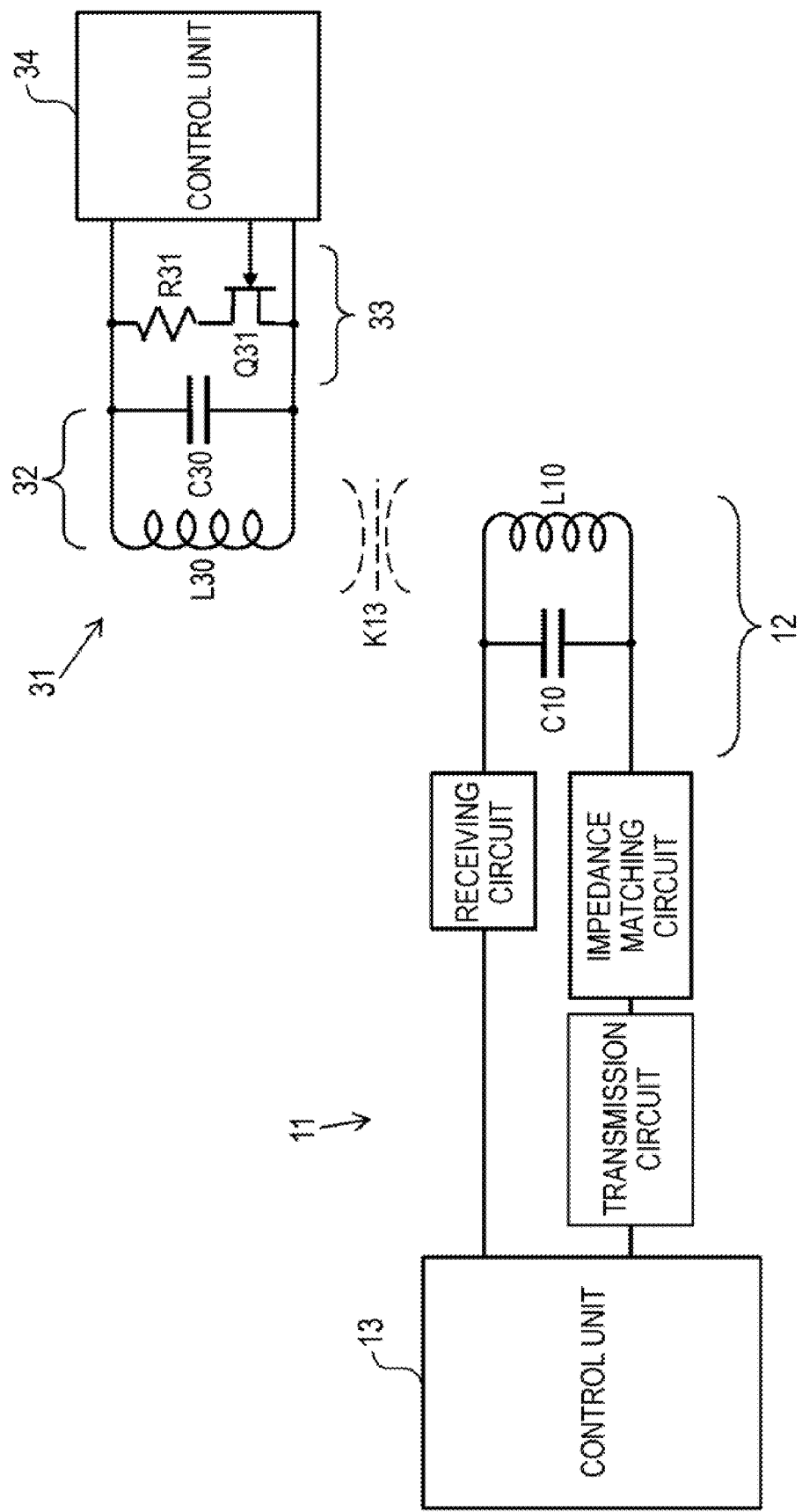
FIG. 2 is a diagram showing configurations of an antenna resonant circuit unit of a reader/writer side and an antenna resonant circuit unit of a transponder side in the communication system shown in FIG. 1 in more detail.

FIG. 1 schematically shows a functional configuration of a communication system according to an embodiment. The shown communication system is a passive-communication type interactive communication system complying with NFC IP-1, which includes a reader/writer 11 and a transponder 31. According to an embodiment of the invention, a Felica format packet is exchanged between the reader/writer 11 and the transponder 31 by a given communication procedure. The reader/writer 11 includes a control unit 13 and an antenna resonant circuit unit 12. The transponder 31 includes a control unit 34, an antenna resonant circuit unit 32 and a load switching modulation circuit unit 33. FIG. 2 shows configurations of the antenna resonant circuits 12, 32 in more detail.

The control unit 13 includes a microcomputer 14, an encoding/decoding circuit 15, a carrier generating circuit 16, an ASK (Amplitude Shift Keying) modulation circuit 17 and a demodulation circuit 18.

The microcomputer 14 controls respective units in the reader/writer 11 to perform processing of transmitting and receiving data. The encoding/decoding unit 15 Manchester encodes data supplied from an information processing apparatus 21 as well as decodes an information signal received from the transponder 31 and demodulated in the demodulation circuit 18, then, supplies the obtained data to the information processing apparatus 21. The carrier generating circuit 16 generates a carrier to be transmitted to the transponder 31 and supplies the carrier to the ASK modulation circuit 17. The ASK modulation circuit 17 performs amplitude modulation of the carrier supplied from the carrier generation circuit 16 based on the signal encoded by the encoding/decoding unit 15 and supplies the carrier to the antenna resonant circuit unit 12. The demodulation circuit 18 demodulates the signal received by the antenna resonant circuit unit 12 and supplies the signal to the encoding/decoding unit 15.

The information processing apparatus 21 formed by, for example, a personal computer (PC) creates given data to be transmitted from the reader/writer 11 to the transponder 31, supplying the data to the control unit 13 of the reader/writer 11 as well as executing given processing which has been previously set when receiving data transmitted from the transporter 31 to the reader/writer 11.

The antenna resonant circuit unit 32 on the transponder 31 side which is electromagnetically coupled with the antenna resonant circuit unit 12 includes a coil $L_{30}$ and a capacitor $C_{30}$, transmitting an information signal generated by the control unit 34 and modulated by the load switching modulation circuit unit 33 to the antenna resonant circuit unit 12 of the reader/writer 11. The antenna resonant circuit unit 32 also receives the information signal from the antenna resonant circuit unit 12 of the reader/writer 11 and supplies the signal to the control unit 34.

A natural resonant frequency of the antenna resonant circuit unit 32 is previously set to a given value by capacitance of the capacitor $C_{30}$ and inductance of the coil $L_{30}$. Normally, the resonant frequency is set to the vicinity of a carrier frequency generated by the carrier generating circuit 16.

The load switching modulation circuit unit 33 includes a resistance $R_{31}$ and a switch $Q_{31}$ having a MOS (Metal Oxide Semiconductor) transistor, which switches on/off the MOS switch $Q_{31}$ according to a symbol series including "1" and "0" obtained by Manchester encoding supplied from the control unit 34 to thereby modulate data to be supplied to the antenna resonant circuit unit 32.

The control unit 34 includes a microcomputer 35, an IC power generating circuit 36, a clock extracting circuit 37, an ASK demodulation circuit 38, an encoding/decoding unit 39, a logic circuit 40 and an EEPROM (Electrically Erasable Programmable Read-Only Memory) 41.

The microcomputer 35 controls respective units in the transponder 31 to perform processing of data to be transmitted or received and perform processing of transmitting/receiving data. The IC power generating circuit 36 rectifies and stabilizes the signal received by the antenna resonant circuit unit 32 to generate power which is necessary for performing various processing in the transponder 31 and supply the power to respective units. The clock extraction unit 37 extracts a clock signal from the signal received by the antenna resonant circuit unit 32 and supplies the signal to the microcomputer 35.

The signal received by antenna resonant circuit unit 32 is the signal modulated by the ASK modulation circuit 17 on the side of the reader/writer 11. The ASK demodulation circuit 38 demodulates the received signal and supplies the signal to the encoding/decoding unit 39. The encoding/decoding unit 39 decodes the signal supplied from the ASK demodulation circuit 38 and supplies the signal to the logic circuit 40. The encoding/decoding unit 39 also encodes data supplied from the logic circuit 40 and supplies the data to the load switching modulation circuit unit 33. The logic circuit 40 performs given processing based on data supplied from the encoding/decoding unit 39, writing new data to the EEPROM 41 or deleting data. The logic circuit 40 also reads the data contents stored in the EEPROM 41 and supplies the contents to the encoding/decoding unit 39.

The coil $L_{10}$ forms a parallel resonant circuit with a capacitor $C_{10}$, operating as an primary coil. The resonant frequency thereof is commonly set to the vicinity of the carrier frequency generated by the carrier generating circuit 16.

In the transponder 31 side, the coil $L_{30}$ as a secondary coil forms a parallel resonant circuit with the capacitor $C_{30}$. The coil $L_{30}$ is electromagnetically coupled with the antenna on the reader/writer 11 side, namely, the coil $L_{10}$ by a coupling coefficient $K_{13}$, and the value is increased as the positions of the both become closer.

In the antenna resonant circuit unit 32, the load switching modulation circuit unit 33 is connected in parallel. The load switching modulation circuit unit 33 includes the resistance $R_{31}$ and the transistor switch $Q_{31}$ connected in series, which can transmit information to the reader/writer 11 by amplitude modulating the magnetic field by operating ON/OFF of the transistor switch $Q_{31}$ based on the signal supplied from the encoding/decoding unit 39 in the control unit.

Subsequently, data transmission/reception processing in the communication system shown in FIG. 1 will be explained with respect to flowcharts shown in FIG. 3 and FIG. 4. The flowchart of FIG. 3 shows a processing procedure executed by the reader/writer 11 and the flowchart of FIG. 4 shows a processing procedure of the transponder 31.

The carrier generating circuit 16 in the control unit 13 of the reader/writer 11 generates a carrier frequency of 13.56 MHz (Step S1).

The control unit 13 acquires data from the information processing apparatus 21 (Step S2), and the encoding/decoding circuit 15 encodes data acquired in Step S2 into a Manchester code and supplies the data to the ASK modulation circuit 17 (Step S3).

The ASK modulation circuit 17 performs ASK modulation of the carrier generated in Step S1 based on the encoded data inputted from the encoding/decoding circuit 15 (Step S4).

The modulated signal which has been ASK modulated by the ASK modulation circuit 17 in Step S4 is supplied to the antenna resonant circuit unit 12 (Step S5). Then, the antenna resonant circuit unit 12 generates an electromagnetic field in accordance with the supplied modulated signal.

As a result of electromagnetic induction by the electromagnetic field generated in Step S5, electromotive force is induced to the antenna resonant circuit 32 on the transponder 31 side (Step S21).

The IC power generating circuit 36 forms a power circuit based on electromotive power induced in Step S21, supplying necessary power to respective units (Step S22).

The clock extraction unit 37 extracts a clock component by the electromotive force induced in Step S21 and supplies the component to the microcomputer 35 (Step S23).

The ASK demodulation circuit 38 performs ASK demodulation of the modulated signal which has been ASK modulated based on voltage amplitude change of the electromotive force induced in Step S21 and supplies the signal to the encoding/decoding circuit 39 (Step S24).

The signal demodulated in Step S24 has been encoded into the Manchester code. The encoding/decoding circuit 39 decodes the signal demodulated in Step S24 and supplies the signal to the logic circuit 40 (Step S25).

The logic circuit 40 stores supplied data in the EEPROM 41, reads or delete data stored in the EEPROM 41 in accordance with a given program which has been previously set. The logic circuit 40 also creates information to be transmitted to the reader/writer 11 (Step S26).

The encoding/decoding unit 39 encodes transmission information created in Step S26 and supplies the information to the load switching modulation circuit unit 33 (Step S27).

The load switching modulation circuit unit 33 performs load switching modulation by changing impedance of the antenna resonant circuit unit 32 based on the signal supplied from the encoding/decoding circuit 39 (Step S28). The antenna resonant circuit unit 32 transmits the demodulated signal (Step S29).

An unmodulated carrier flows in the antenna resonant circuit unit 12 of the reader/writer 11, and voltage amplitude change is induced in accordance with impedance change generated in Step S29 to the carrier. The antenna resonant circuit unit 12 receives the signal from the transponder 31 by detecting the change in Step S6.

The demodulation circuit 18 demodulates the signal based on the voltage amplitude change induced in Step S6 and supplies the signal to the encoding/decoding circuit 15 (Step S7). The encoding/decoding circuit 15 decodes the demodulated signal (Step S8), and supplies the obtained reception data to the information processing apparatus 21 (Step S9).

Figure 15:
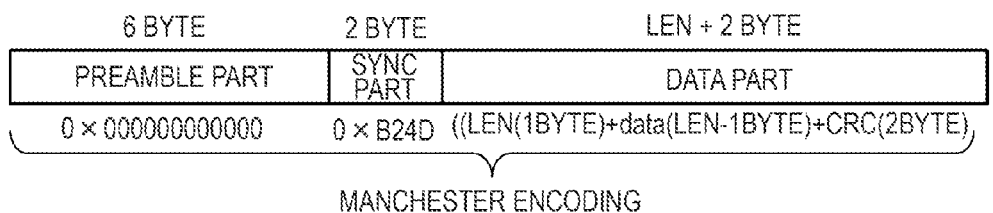
FIG. 15 is a diagram showing a packet structure of Felica format.
Figure 16:
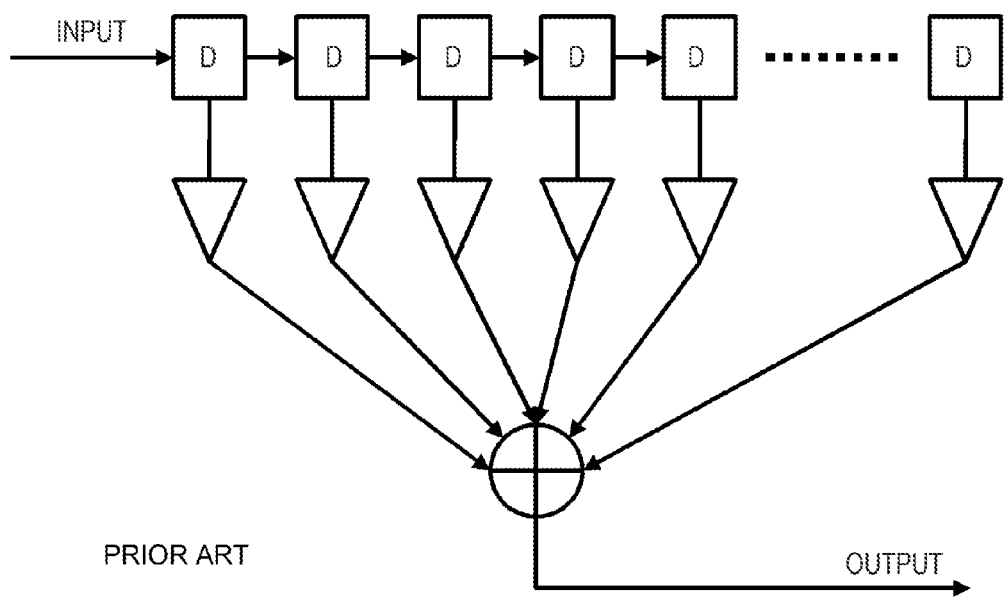
FIG. 16 is a view schematically showing a configuration of the FIR filter.

As already have been described, the Manchester code is used in Felica, and the same packet format is used in downlink and uplink (refer to FIG. 15).

When the transmission rate between the reader/writer 11 and the transponder 31 is increased to 424 kbps, 848 kbps, 1.7 Mbps, 3.4 Mbps which are multiples of 212 kbps, the frequency band of the transmission signal becomes wide in proportion to the speed, effects of frequency characteristics in a channel, a transmission RF analog circuit and a reception RF analog circuit are increased, as a result, disorder of a received waveform is increased. That is, in order to realize high-speed communication in the contactless communication using the electromagnetic coupling, adaptive equalization will be necessary on the reception side for compensating deterioration of frequency characteristics. Accordingly, in the embodiment, the disorder of the received signal is compensated by applying adaptive equalization in, for example, a receiving circuit on the reader/writer 11 side.

A sufficiently long signal series for learning is necessary for performing adaptive equalization, however, when such signal series is transmitted, there exists a compatibility problem with respect to the Felica format (FIG. 15) prescribed in NFC IP-1 standard, and further, reduction of the communication rate due to overhead increase may be brought about.

Accordingly, in the embodiment, adaptive equalization is performed by using the sync part of the packet using the packet format of the Felica format as it is, for example, in the receiving circuit of the reader/writer 11 side (naturally, adaptive equalization may be performed in the same manner in the receiving circuit of the transponder 31 side). According to this, it is possible to avoid the compatibility problem and the overhead increase. Actually, a delay buffer is provided in the receiving circuit to thereby realize both the frame synchronization using the sync part and adaptive equalization using the same sync part.

Figure 5:
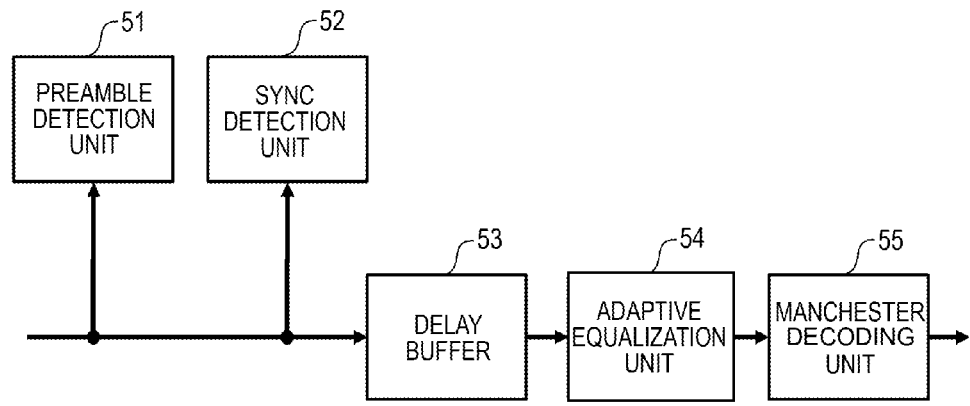
FIG. 5 is a diagram showing a configuration of a receiving circuit performing adaptive equalization using a packet format as it is.

FIG. 5 schematically shows a configuration of the receiving circuit performing adaptive equalization using the packet format as it is. The shown receiving circuit includes a preamble detection unit 51, a sync detection unit 52, a delay buffer 53, an adaptive equalization unit 54 and a Manchester decoding unit 55. Respective operations in the case of receiving a received signal having the packet format shown in FIG. 15 will be explained below.

The received signal is inputted to the preamble detection unit 51 first. When the preamble detection unit 51 detects a preamble part which is a continuous waveform in the received signal, the preamble detection unit 51 extracts sampling timing based on the continuous waveform and synchronizes timing.

Next, the received signal is inputted to the sync detection unit 52. The sync detection unit 52 detects a sync part having a pattern in which "0xB24D" is Manchester encoded based on the received signal and the sampling timing extracted by the preamble sampling detection unit 51 and synchronizes the frame. For the detection of the sync part, methods such as pattern matching and cross correlation are commonly used. In either detection methods, the identity with respect to a known specific pattern of the sync part is found. Normally, the identity of the pattern is checked by using almost the whole sync part for increasing noise resistance. The sync detection unit 52, when detecting the sync part, outputs a timing signal indicating a start position of the sync part.

On the other hand, the received signal is also inputted to the delay buffer 53. The delay buffer 53 gives delay longer than the length of the sync part to the received signal to be inputted. More accurately, the delay buffer 53 gives delay so that the head of the sync part is not outputted until the sync detection unit 52 determines the detection of the sync part. For example, if the sync detection unit 52 can synchronize the frame only by using the front half of the sync part, the delay amount of the delay buffer 53 can be approximately the half of the sync part. Or, if the sync detection unit 52 synchronizes the frame by using the whole sync part, the whole sync part is necessary as the delay amount of the delay buffer 53.

The received signal delayed by the delay buffer 53 is inputted to the adaptive equalization unit 54. Then, the Manchester decoding unit 55 in the subsequent stage performs Manchester decoding of the equalized output signal from the adaptive equalization unit 54 to reproduce original information bits of binary values.

The adaptive equalization unit 54 is a learning-type equalization circuit including a FIR filter and a learning circuit, compares the received signal and the sync pattern included therein based on the timing signal showing the start position of the sync part outputted by the sync detection unit 52. Then, tap coefficients of the FIR filter are adjusted so as to reduce the difference.

Figure 14:
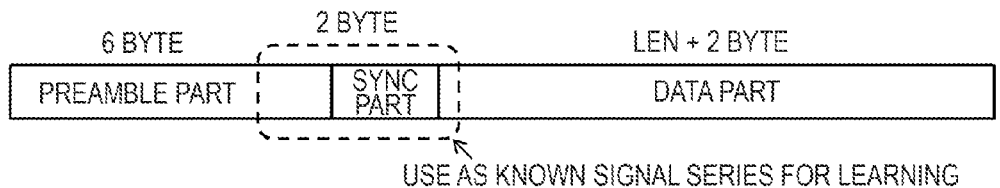
FIG. 14 is a diagram for explaining a method of performing learning using a longer known signal series by using the last several symbols of the preamble part and the sync part at the same time.

The adaptive equalization unit 54 uses last several symbols of the preamble part and the sync part at the same time to thereby perform learning using a longer known signal series (refer to FIG. 14).

Figure 6:
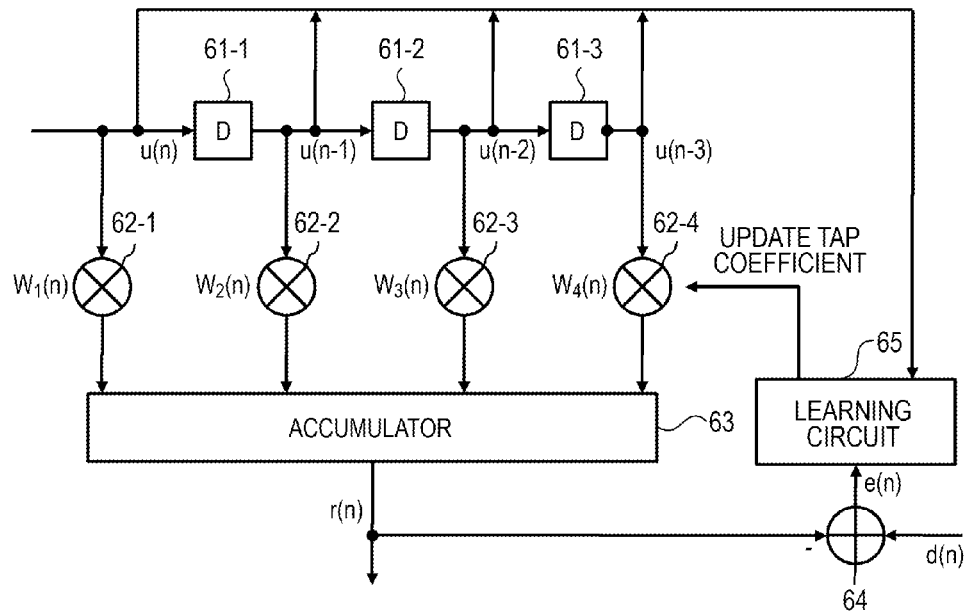
FIG. 6 is a diagram showing an internal configuration example of an adaptive equalization unit configured by using a FIR filter.

FIG. 6 shows an internal configuration example of the adaptive equalization unit 54. The shown adaptive equalization unit 54 uses NLMS (Normalized Least Mean Square) as a learning algorithm. The adaptive equalization processing will be explained with reference to the drawing and formulas below.

The tap number of the shown FIR filter is M, and the filter includes a delay line in which (M−1) pieces of delay elements (D) 61-1, 61-2, . . . are connected in series (FIG. 6 is shown as M=4 for simplifying the drawing). Each delay element has delay time "D" corresponding to a sampling period, respectively.

Here, when a sampling time is "n" and the received signal at the time "n" is "u(n)", time-series input data for the tap number M, namely, u(n), u(n−1), . . . , u(n−M+1) can be obtained.

Multipliers 62-1, 62-2, . . . as many as the tap number have tap coefficients $w_1(n)$, $w_2(n)$, . . . , $w_M(n)$ corresponding to filter characteristics respectively, performing weighted multiplication of the M-pieces of input data u(n), u(n−1), . . . , u(n−M+1), respectively.

An accumulator 63 adds and averages the time-series input data which have been weighted by corresponding tap coefficients respectively to obtain an equalized output signal "r(n)" at the time "n". The above equalization processing can be represented as the following formula (1).

$$u^T(n)=[u(n),u(n-1),u(n-2),\ldots,u(n-M+1)]$$

$$w^T(n)=[w_1(n),w_2(n),w_3(n),\ldots,w_M(n)]$$

$$r(n)=w^H(n)\cdot u(n) \quad (1)$$

Subsequently, the learning of the tap coefficient will be explained. A reference signal d(n) is inputted to an adder 64 with the equalized output signal r(n), and an error signal e(n) which is the difference there between is outputted. The reference signal d(n) corresponds to a pattern in which "0xB24D" is Manchester encoded, which have been previously included in the adaptive equalization unit 54.

When the time-series input data u(n), u(n−1), . . . , u(n−M+1) at the time "n" and the error signal e(n) are inputted, a learning circuit 65 determines tap coefficients $w_1(n+1)$, $w_2(n+1)$, . . . , $w_M(n+1)$ of the FIR filter at the next time by using the NLMS algorithm so that the equalized output signal "r" from the FIR filter comes close to the reference signal "d", supplying them to respective multipliers 62-1, 62-2, . . . . Update formulas of the error signal e(n) and the tap coefficients are represented as the following formula (2).

$$e(n) = d(n) - r(n) \quad (2)$$

$$w(n+1) = w(n) + \frac{\alpha \cdot u(n)}{\|u(n)\|^2} \cdot e^*(n)$$

The update formulas shown in the above formula (2) are repeatedly performed, as a result, respective tap coefficients $w_1(n), w_2(n), \ldots, w_M(n)$ of the FIR filter are converged so as to reduce the error signal e(n).

Here, "α" in the above formula (2) represents a step size, and 0<α<2. When "α" is close to "1", convergence is performed at high speed, however, the variation of error is increased. When "α" is close to "0", convergence is performed slowly, however, the variation of error is reduced.

The learning circuit 65 sets the step size α to a value close to "1" in the front half of the sync part to thereby perform high-speed learning while permitting variation of error. In the following last half of the sync part, the learning circuit 65 sets the step size α to a value close to "0" to thereby perform lower-speed learning to reduce variation of error. Accordingly, the learning circuit 65 realizes learning of adaptive equalization with high-speed convergence and small convergence error on the whole.

In the learning circuit 65, it is also preferable that last several symbols of the preamble part and the sync part are used at the same time instead of using only the sync part as the known signal series to thereby perform learning using the longer known signal series (refer to FIG. 14).

Then, the learning circuit 65 stops the learning function of the tap coefficient by the NLMS algorithm at the timing when the data part following the sync part is outputted from the adaptive equalization unit 54 (FIR filter). Accordingly, equalization processing using the learned tap coefficient is executed to the data part continuously. Then, the equalized data part is inputted to the Manchester decoding unit 55 in the subsequent stage of the adaptive equalization unit 54 and the transmitted information bits are taken out.

In the above explanation, the adaptive equalization unit 54 performs learning of the tap coefficient only at the sync part and stops the learning function at the data part, however, it is also preferable that the step size α is set to a lower value to continue the learning also at the data part, instead of stopping learning at the end of the sync part. The learning is continued also at the data part, thereby performing learning using the longer signal series.

Figure 7:
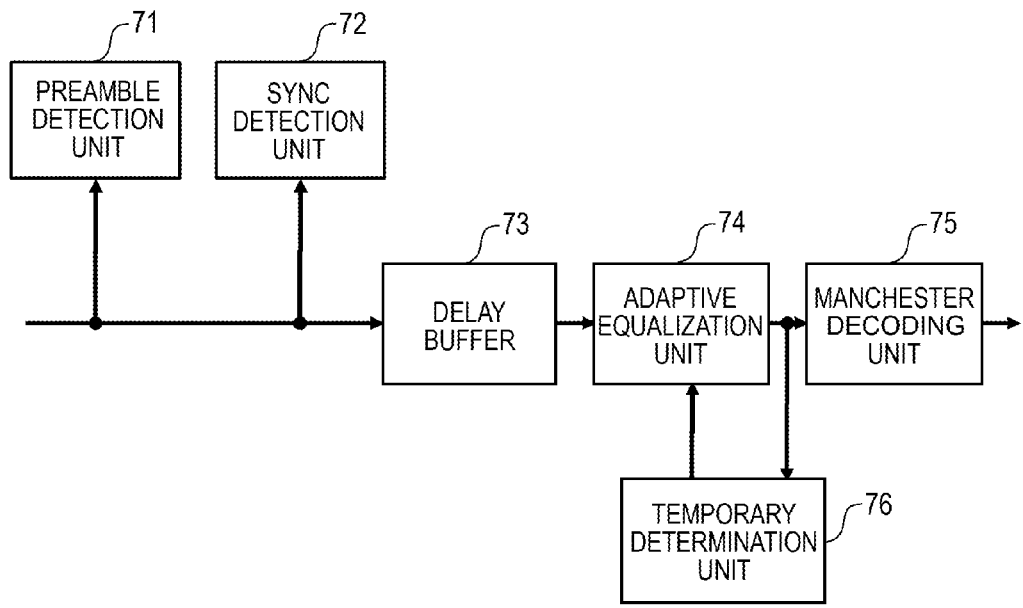
FIG. 7 is a diagram showing a modification example of the receiving circuit representing another modification example of the adaptive equalization unit which performs learning also at the data part continued from the sync part.

FIG. 7 shows a modification example of the receiving circuit shown in FIG. 5. In the shown receiving circuit, the step size α is set to a lower value to thereby continue the learning also at the data part. As a reference signal used when performing learning at the data part, a transmission waveform obtained from the equalized data part is used. Hereinafter, respective operations of the receiving circuit shown in FIG. 7 when receiving the received signal having the packet format shown in FIG. 15 will be explained.

A preamble detection unit 71, when detecting the preamble part which is a continuous waveform from the inputted received signal, extracts sampling timing based on the continuous waveform to synchronize timing. Next, a sync detection unit 72 detects the sync part having the pattern in which "0xB24D" is Manchester encoded based on the received signal and the sampling timing extracted by the preamble detection unit 71 and synchronizes the frame.

On the other hand, the received signal is also inputted to a delay buffer 73, which gives delay so that the head of the sync part is not outputted until the sync detection unit 72 determines the detection of the sync part. Then, the received signal delayed by the delay buffer 73 is inputted to an adaptive equalization unit 74.

Since the internal configuration of the adaptive equalization unit 74 is the same as FIG. 6, it is not shown. Further, the learning of the tap coefficient in the sync part is the same as the above, therefore, the explanation is omitted here. In the data part following the sync part, equalization processing using the tap efficient learned at the sync part is performed.

Then, the equalized data part is inputted to a temporary determination unit 76. The temporary determination unit 76 performs temporary determination based on, for example, a sign of the signal to be inputted. That is, when the sign of the input signal is "+(plus)", "+1" is outputted and when the sign is "−(minus)", "−1" is outputted (when the input signal is "0", either of the determinations is made).

Then, the temporary determination output of the temporary determination 76 (a transmission waveform obtained from the equalized data part) is inputted to an adaptive equalization unit 74. The adaptive equalization unit 74 uses the input as a reference signal at the time of performing learning at the data part. That is, the temporary determination output is used as the reference signal d(n) with respect to the equalized output signal "r(n)" in the adaptive equalization unit shown in FIG. 6 to continue learning at the data part. Then, a Manchester decoding unit 75 in the subsequent stage performs Manchester decoding of the equalized output signal from the adaptive equalization unit 74 to reproduce original information bits of binary values.

Naturally, the adaptive equalization unit 74 may perform learning by using last several symbols of the preamble part at the same time (the same as the above).

Figure 8:
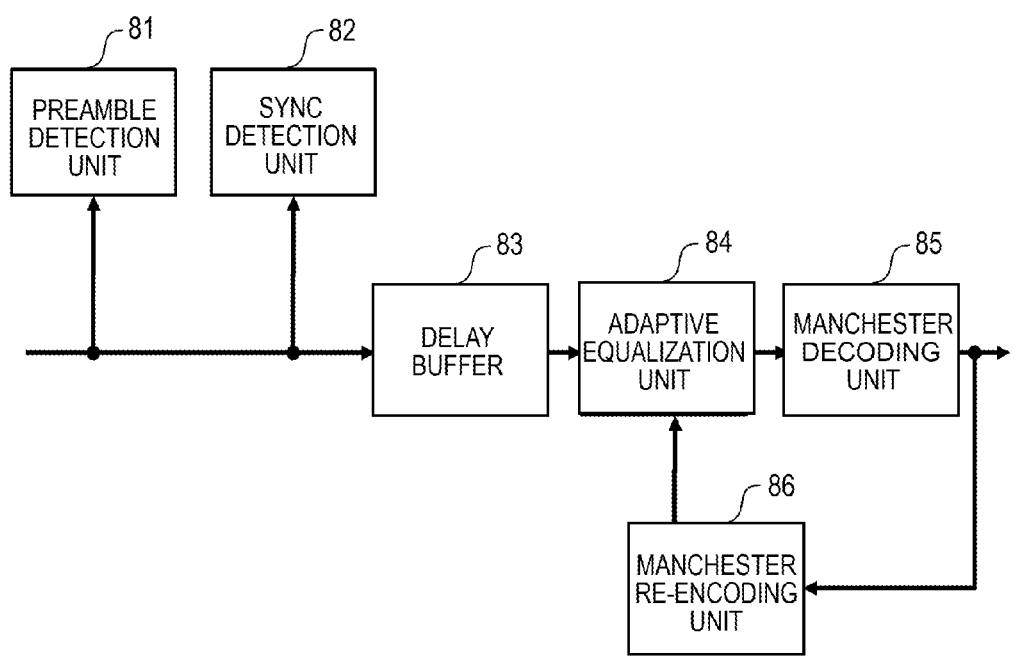
FIG. 8 is a diagram showing further another modification example of the receiving circuit which continues the learning also at the data part following the sync part.

FIG. 8 shows another modification example of the receiving circuit which continues the learning also at the data part following the sync part.

A preamble detection unit 81, when detecting the preamble part which is a continuous waveform in the inputted received signal, extracts sampling timing based on the continuous waveform and synchronizes timing. Next, a sync detection unit 82 detects the sync part having the pattern in which "0xB24D" is Manchester encoded based on the received signal and the sampling timing extracted by the preamble detection unit 81 and synchronizes the frame.

On the other hand, the received signal is also inputted to a delay buffer 83, which gives delay so that the head of the sync part is not outputted until the sync detection unit 82 determines the detection of the sync part. Then, the received signal delayed by the delay buffer 83 is inputted to an adaptive equalization unit 84.

Since the internal configuration of the adaptive equalization unit 84 is the same as FIG. 6, it is not shown. Further, the learning of the tap coefficient in the sync part is the same as the above, therefore, the explanation is omitted here. In the data part following the sync part, equalization processing using the tap efficient learned at the sync part is performed. Then, the equalized data part is inputted to a Manchester decoding unit 85, where the data is Manchester decoded to reproduce original information bits of binary values.

The information bits outputted from the Manchester decoding unit 85 inputted to a Manchester re-encoding unit 86, where the information bits are converted into a signal series which has been Manchester encoded. The re-encoded signal series is inputted to the adaptive equalization unit 84 and used as a reference signal. That is, the re-encoded signal series is used in the adaptive equalization unit shown in FIG. 6 as the reference signal "d(n)" with respect to the equalized output signal "r(n)" to continue the learning in the data part.

Naturally, the adaptive equalization unit 74 may perform learning by using last several symbols of the preamble part at the same time (the same as the above).

The learning algorithm of the adaptive equalization unit explained as the above combines NLMS with the FIR filter, which is called NLMS-LE (Lenear Equalizer). However, the gist of the invention is not limited to the specific learning algorithm, and for example, other algorithms such as LMS (Least Mean Square) and RLS (Recursive Least Square) can be used.

It is also preferable that adaptive equalization unit in the receiving circuit shown in FIG. 5, FIG. 7 and FIG. 8 respectively is formed by using a DFE (Decision Feedback Equalizer) instead of the FIR filter.

Figure 9:
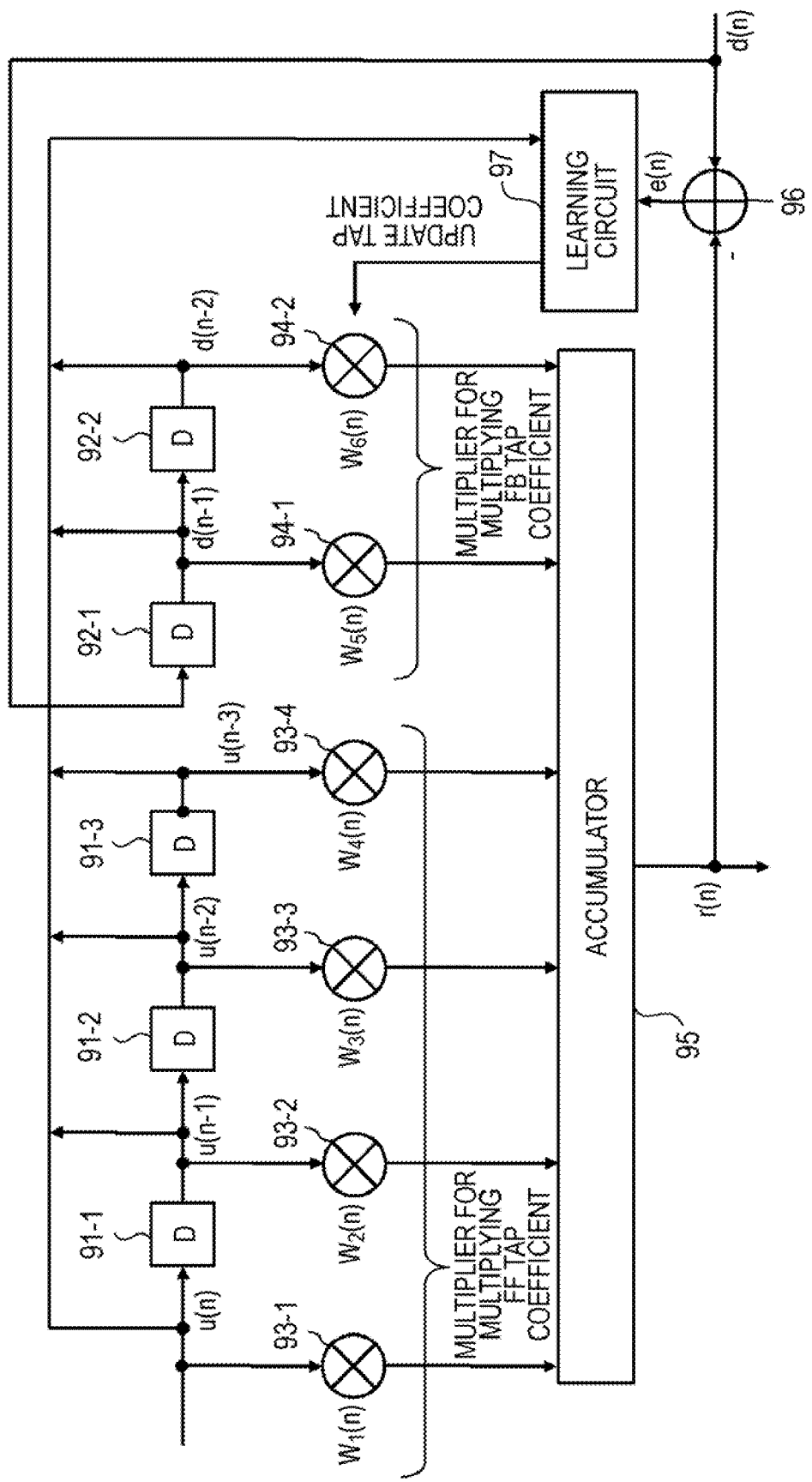
FIG. 9 is a diagram showing an internal configuration example of an adaptive equalization unit configured as an NLMS-DFE using a DFE.

FIG. 9 shows an internal configuration example of an adaptive equalization unit which is configured as an NLMS-DFE using the DFE.

In the DFE, the feed forward (FF) tap number is N (N is a positive integer lower than M) and the feedback (FB) tap number is (M−N) in the total tap number M, and the DFE includes a FF delay line in which (N−1) pieces of delay elements (D) 91-1, 91-2, . . . , 91-(N−1) are connected in series, and a FB delay line in which (M−N) pieces of delay elements (D) 92-1, . . . , 92-(M−N) are connected in series (FIG. 9 is shown as M=6, N=4 for simplifying the drawing). Each delay element has delay time "D" corresponding to a sampling period, respectively.

Here, when a sampling time is "n" and the received signal at the time "n" is "u(n)", time-series FF input data for the tap number N, namely, u(n), u(n−1), . . . , u(n−N+1) can be obtained. When the reference signal which has been already included in the adaptive equalization unit is d(n), time-series reference data for the FB tap number (M−N), namely, d(n−1), . . . , d(n−(M−N) can be obtained. The reference number d(n) corresponds to a pattern in which "0xB24D" is Manchester encoded.

Multipliers 93-1, 93-2, . . . , 93-N as many as the FF tap number N have FF tap coefficients $w_1(n), w_2(n), \ldots, w_N(n)$ respectively, performing weighted multiplication of the N-pieces of input data u(n), u(n−1), . . . , u(n−N+1), respectively. Multipliers 94-1, . . . , 94-(M−N) as many as the FB tap number (M−N) have FB tap coefficients $w_{N+1}(n), \ldots, w_M(n)$ respectively, performing weighted multiplication of the (M−N) pieces of time-series reference data d(n−1), . . . , d(n−M−N) respectively.

An accumulator 95 adds and averages the time-series input data which have been weighted by corresponding FF tap coefficients respectively and the time-series reference data which have been weighted by corresponding FB tap coefficients respectively to obtain an equalized output signal "r(n)" at the time "n". The above equalization processing can be represented as the following formula (3).

$$u^T(n)=[u(n),u(n-1),\ldots,u(n-N+1),d(n-1),\ldots,d(n-M+N)]$$

$$w^T(n)=[w_1(n),w_2(n),w_3(n),\ldots,w_M(n)]$$

$$r(n)=w^H(n)\cdot u(n) \quad (3)$$

The reference signal d(n) is inputted to an adder 96 with the equalized output signal r(n), and an error signal e(n) which is the difference there between is outputted. The reference signal d(n) corresponds to a pattern in which "0xB24D" is Manchester encoded, which have been previously included in the adaptive equalization unit.

When the time-series input data u(n), u(n−1), . . . , u(n−N+1), time-series reference data d(n−1), . . . , d(n−(M−N)) at the time "n" and the error signal e(n) are inputted, a learning circuit 97 determines tap coefficients $w_1(n+1), w_2(n+1), \ldots, w_M(n+1)$ at the next time by using the NLMS algorithm (or LMS, RLS) so that the equalized output signal "r" from the DFE comes close to the reference signal "d", supplying them to respective multipliers 93-1, 93-2, . . . , 93-N as well as multipliers 94-1, . . . , 94-(M−N). Update formulas of the error signal e(n) and the tap coefficients are represented as the following formula (4).

$$e(n) = d(n) - r(n) \quad (4)$$
$$w(n+1) = w(n) + \frac{\alpha \cdot u(n)}{\|u(n)\|^2} \cdot e^*(n)$$

The update formulas shown in the above formula (4) are repeatedly performed, as a result, respective FF and FB tap coefficients $w_1(n), w_2(n), \ldots, w_M(n)$ of the DEF are converged so as to reduce the error signal e(n).

Here, "α" in the above formula (4) represents the step size, and 0<α<2. When "α" is close to "1", convergence is performed at high speed, however, the variation of error is increased. When "α" is close to "0", convergence is performed slowly, however, the variation of error is reduced. The learning circuit 97 sets the step size α to a value close to "1" in the front half of the sync part to thereby perform high-speed learning while permitting variation of error. In the following last half of the sync part, the learning circuit 65 sets the step size α to a value close to "0" to thereby perform lower-speed learning to reduce variation of error. Accordingly, the learning circuit 97 realizes learning of adaptive equalization with high-speed convergence and small convergence error on the whole (the same as the above).

In the learning circuit 97, it is also preferable that last several symbols of the preamble part and the sync part are used at the same time instead of using only the sync part as the known signal series (refer to FIG. 14) to thereby perform learning using the longer known signal series (the same as the above).

Then, the learning circuit 97 stops the learning function of the tap coefficient by the NLMS algorithm at the timing when the data part following the sync part is outputted from the DFE. Accordingly, equalization processing using the learned tap coefficient is executed to the data part continuously. It is also preferable that the learning circuit sets the step size α to a lower value and continues the learning also at the data part, instead of stopping learning at the end of the sync part. In this case, a transmission waveform obtained from the equalized data part is used as a reference signal (refer to FIG. 7 and FIG. 8). The learning is continued also at the data part, thereby performing learning using the longer signal series (the same as the above).

Figure 17:
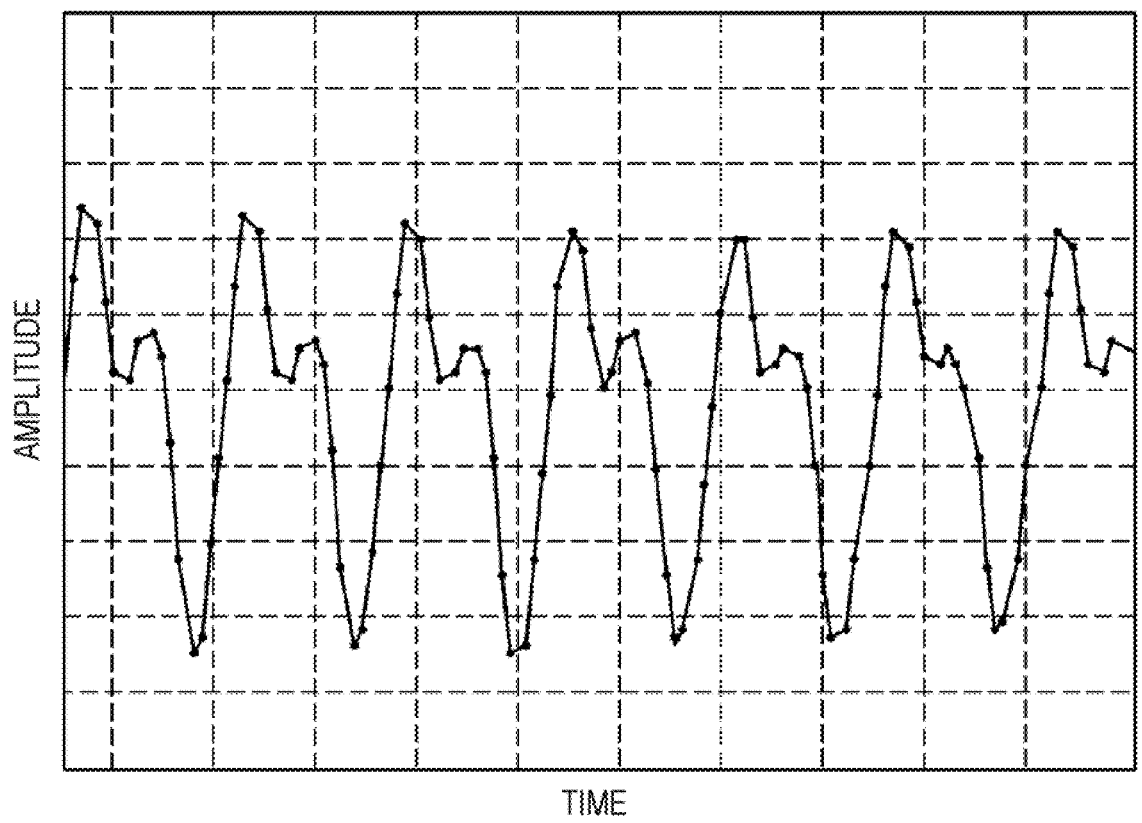
FIG. 17 is a graph showing amplitude variation of a demodulated signal (preamble part) obtained on the side of the other party of communication when load modulation is performed with respect to a carrier signal generated by the other party of communication.

In the case of the communication system performing data transmission by load modulation of the antenna such as the NFC communication, transient response characteristics may differ according to the change direction of electrical load (namely, a direction in which load resistance of the antenna is turned off from on and a direction in which it is turned on from off) when performing load modulation of the antenna (as described above or refer to FIG. 17). Accordingly, it can be considered that it is difficult to obtain sufficient improvement of reception characteristics even when adaptive equalization using the normal FIR filter is performed. According to an embodiment of the invention, a method of performing adaptive equalization by applying a FIR filter which uses two-types of tap coefficients according to the change direction of the electrical load can be cited.

Figure 10:
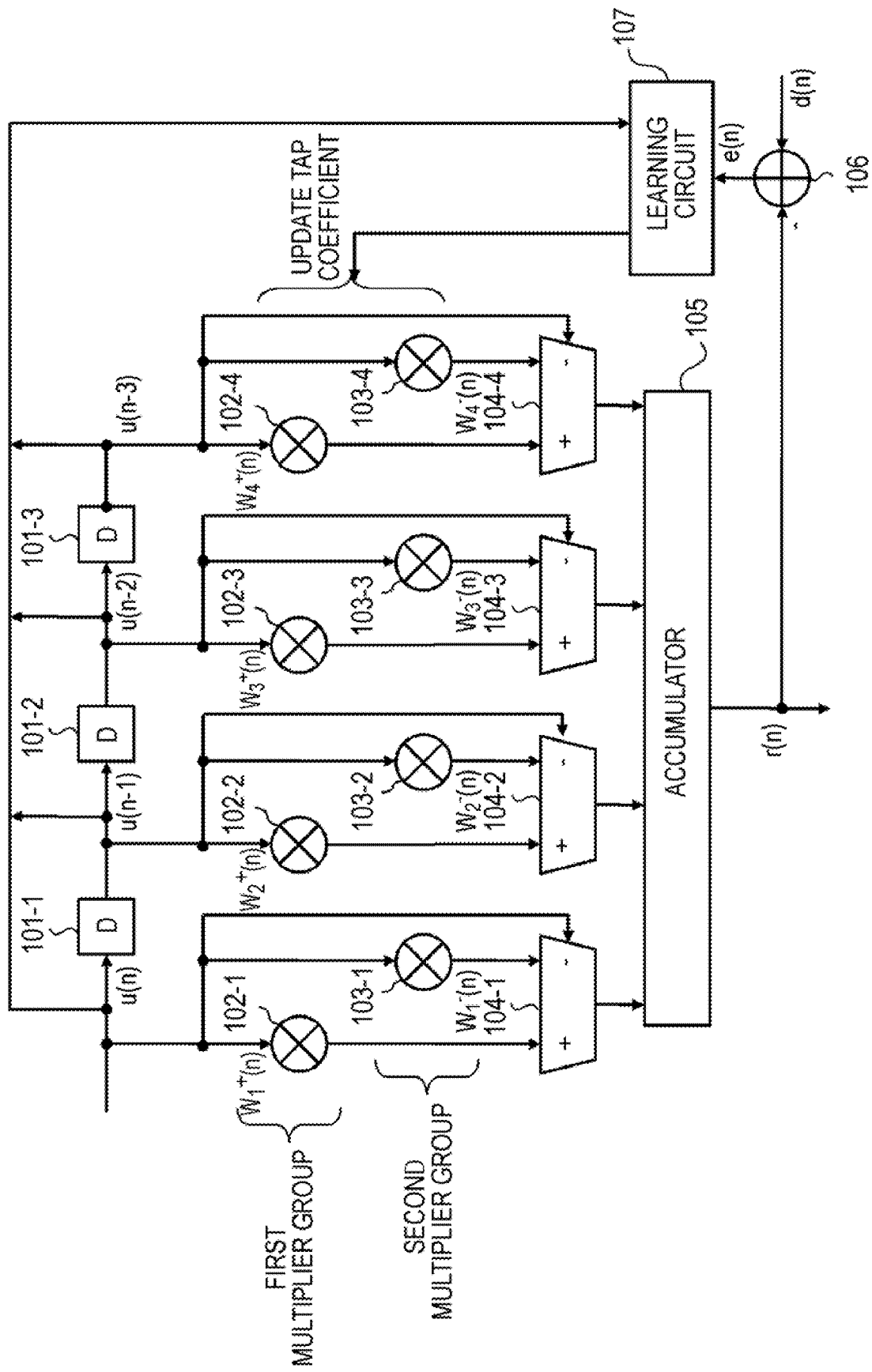
FIG. 10 is a diagram showing an internal configuration example of an adaptive equalization unit using a FIR filter which uses two-types of tap coefficients according to a change direction of electrical load.

FIG. 10 shows an internal configuration example of an adaptive equalization unit using a FIR filter which uses two-types of tap coefficients according to the change direction of electrical load is shown.

The tap number of the shown FIR filter is M, and the filter includes a delay line in which (M−1) pieces of delay elements (D) 101-1, 101-2, . . . are connected in series (FIG. 10 is shown as M=4 for simplifying the drawing). Each delay element has delay time "D" corresponding to a sampling period, respectively. Here, when a sampling time is "n" and the received signal at the time "n" is "u(n)", time-series input data for the tap number, namely, u(n), u(n−1), . . . , u(n−M+1) can be obtained.

Multipliers 102-1, 102-2, . . . included in a first multiplier group have tap coefficients $w^+_1(n)$, $w^+_2(n)$, . . . , $w^+_M(n)$ respectively, which corresponds to filter characteristics (transient response characteristics) in the direction in which load resistance of the antenna is turned on from off. On the other hand, multipliers 103-1, 103-2, . . . included in a second multiplier group have tap coefficients $w^-_1(n)$, $w^-_2(n)$, . . . , $w^-_M(n)$ respectively, which corresponds to filter characteristics (transient response characteristics) in the direction in which load resistance of the antenna is turned off from on. Then, respective multipliers 102-1, 102-2, . . . in the first multiplier group as well as multipliers 103-1, 103-2, . . . in the second multiplier group performs weighted multiplication of the M-pieces of input data u(n), u(n−1), . . . , u(n−M+1) by tap coefficients included therein.

Each selector 104-i outputs a multiplication result with respect to any one of $w_i^+(n)$ and $w_i^-(n)$ selectively according to the change direction of the electrical load, in other words, positive and negative signs of the input data u(n−i+1).

An accumulator 105 adds and averages the time-series input data which have been weighted by corresponding tap coefficients respectively to obtain an equalized output signal "r(n)" at the time "n". The above equalization processing can be represented as the following formula (5).

$$u^T(n) = [u(n), u(n-1), u(n-2), \ldots, u(n-M+1)] \quad (5)$$

$$w^{+T}(n) = [w_1^+(n), w_2^+(n), w_3^+(n), \ldots, w_M^+(n)]$$

$$w^{+T}(n) = [w_1^-(n), w_2^-(n), w_3^-(n), \ldots, w_M^-(n)]$$

$$w^T(n) = [w_1(n), w_2(n), w_3(n), \ldots, w_M(n)]$$

$$w_i(n) = \begin{cases} w_i^+(n) & (\text{if } u(n-i+1) \geq 0) \\ w_i^-(n) & (\text{if } u(n-i+1) < 0) \end{cases} \quad i = 1, 2, \ldots, M$$

$$r(n) = w^H(n) \cdot u(n)$$

A reference signal d(n) is inputted to an adder 106 with the equalized output signal r(n), and an error signal e(n) which is the difference there between is outputted. The reference signal d(n) corresponds to a pattern in which "0xB24D" is Manchester encoded, which have been previously included in the adaptive equalization unit.

When the time-series input data u(n), u(n−1), . . . , u(n−M+1) at the time "n" and the error signal e(n) are inputted, a learning circuit 107 determines tap coefficients $w^+_1(n+1)$, $w^+_2(n+1)$, . . . , $w^+_M(n+1)$ of the first multiplier group as well as tap coefficients $w^-_1(n+1)$, $w^-_2(n+1)$, . . . , $w^{31}_M(n+1)$ of the second multiplier group at the next time by using the NLMS algorithm (or LMS, RLS) so that the equalized output signal "r" from the FIR filter comes close to the reference signal "d", supplying them to multipliers 102-1, 102-2, . . . as well as multipliers 103-1, 103-2, . . . . Update formulas of the error signal e(n) and the tap coefficients are represented as the following formula (6). The update of tap coefficients is performed only to tap coefficients selected by the selectors 104, and tap coefficients which have not been selected are not updated.

$$e(n) = d(n) - r(n) \quad (6)$$

$$w(n+1) = w(n) + \frac{\alpha \cdot u(n)}{\|u(n)\|^2} \cdot e^*(n)$$

The update formulas shown in the above formula (6) are repeatedly performed, as a result, respective tap coefficients $w^+_1(n)$, $w^+_2(n)$, . . . , $w^+_M(n)$ as well as $w^-_1(n)$, $w^-_2(n)$, . . . , $w^-_M(n)$ of the FIR filter are converged so as to reduce the error signal e(n).

"α" in the above formula (6) represents the step size, and 0<α<2. When "α" is close to "1", convergence is performed at high speed, however, the variation of error is increased. When "α" is close to "0", convergence is performed slowly, however, the variation of error is reduced. The learning circuit 107 sets the step size α to a value close to "1" in the front half of the sync part to thereby perform high-speed learning while permitting variation of error. In the following last half of the sync part, the learning circuit 107 sets the step size α to a value close to "0" to thereby perform lower-speed learning to reduce variation of error. Accordingly, the learning circuit 107 realizes learning of adaptive equalization with high-speed convergence and small convergence error on the whole (the same as the above).

In the learning circuit 107, it is also preferable that last several symbols of the preamble part and the sync part are used at the same time (refer to FIG. 14) instead of using only the sync part as the known signal series to thereby perform learning using the longer known signal series (the same as the above). Moreover, a transmission waveform obtained from the equalized data part is used as a reference signal as shown in FIG. 7 and FIG. 8 and the learning is continued also at the data part, thereby performing learning using the longer signal series.

Figure 11:
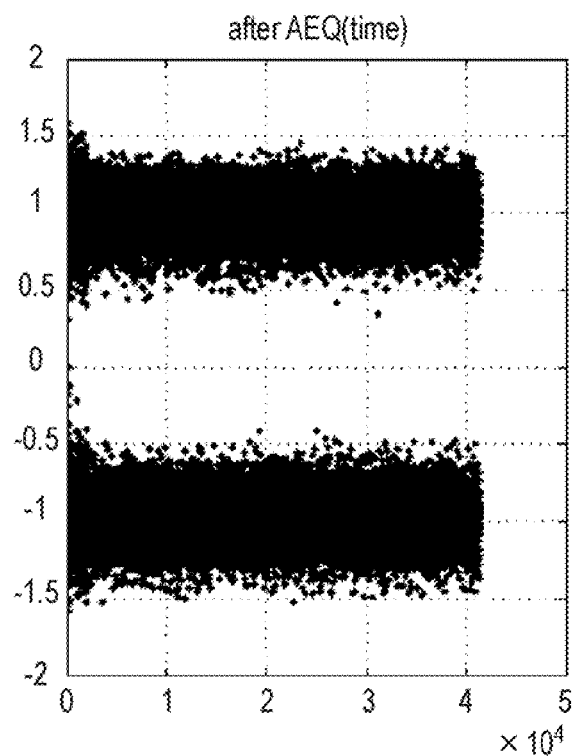
FIG. 11 is a graph showing signal point distribution after a BPSK modulated signal is equalized at the adaptive equalization unit using the FIR filter which uses two-types of tap coefficients according to the change direction of electrical load.
Figure 12:
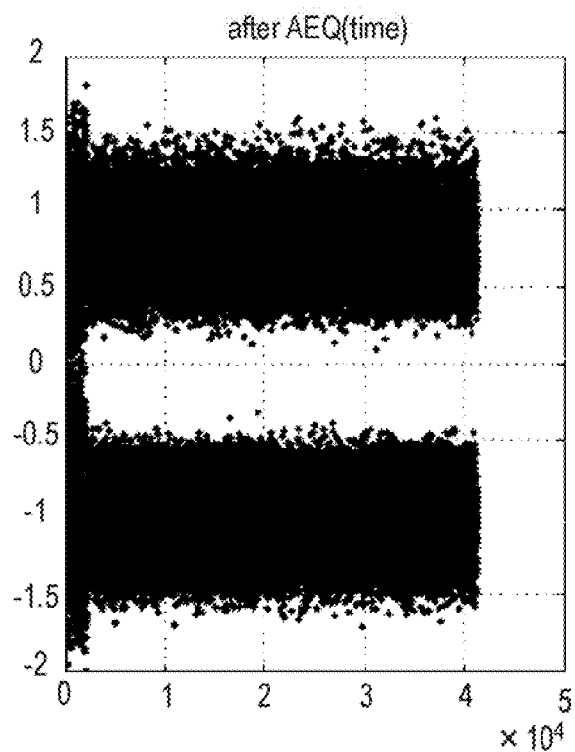
FIG. 12 is a graph showing signal point distribution after the BPSK modulated signal is equalized at the adaptive equalization unit using the (normal) FIR filter using only one type tap coefficient.

FIG. 11 shows signal point distribution after a BPSK (Binary Phase Shift Keying) modulated signal is equalized at the adaptive equalization unit using the FIR filter which uses two-types of tap coefficients according to the change direction of electrical load which is shown in FIG. 10. For comparison, FIG. 12 shows signal point distribution after the BPSK modulated signal is equalized at the adaptive equalization unit using the (normal) FIR filter using only one type tap coefficient (regardless of the change direction of electrical load). When comparing FIG. 11 to FIG. 12, it is found that equalization of signal points are performed in good condition by the FIR filter using two-types of tap coefficients according to the change direction of electrical load. Note that such result can be obtained by using various training signals not only in the case of performing adaptive equalization using only the sync part of the Felica format.

The method of using two-types of tap coefficients according to the change direction of electrical load is not limited to the adaptive equalization unit of the NLMS-LE configuration in which NLMS is combined with the FIR filter, but also can be applied to the case of learning the tap coefficient by using other algorithms such as LMS an RLS in the same manner. Also in the adaptive equalization unit configured by using the DFE instead of the FIR filter, two-types of tap coefficients are used according to the change direction of electrical load in the same manner, thereby improving equalization characteristics.

Figure 13:
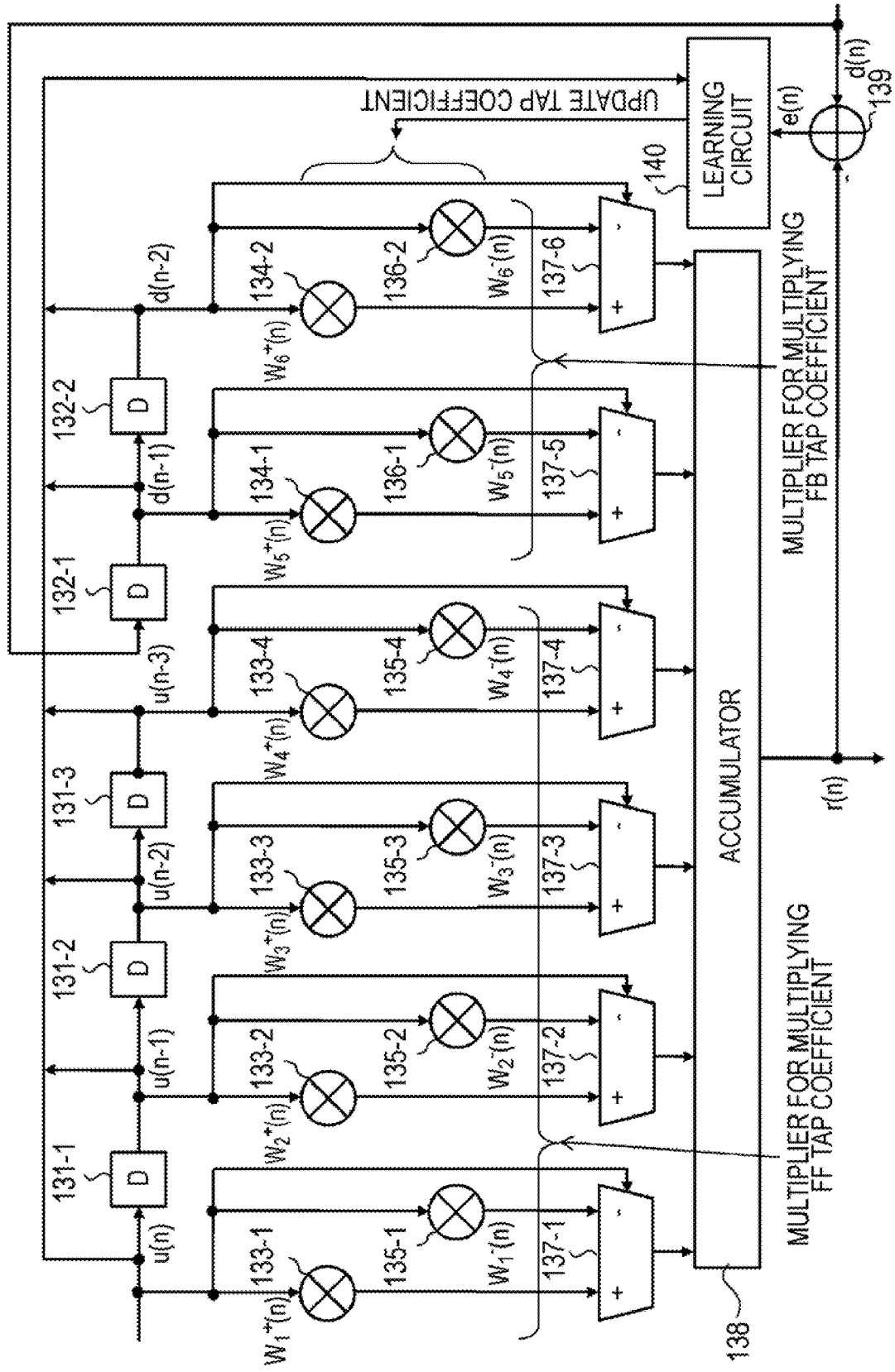
FIG. 13 is a diagram showing an internal configuration example of the adaptive equalization unit using the DFE which uses two-types of tap coefficients according to the change direction of electrical load.

FIG. 13 shows an internal configuration example applying the DFE which uses two-types of tap coefficients according the change direction of electrical load.

In the shown equalizer, the FF tap number is N (N is a positive integer lower than M) and the FB tap number is (M−N) in the total tap number M, and the equalizer includes a FF delay line in which (N−1) pieces of delay elements (D) 131-1, 131-2, . . . , 131-(N−1) are connected in series and a FB delay line in which (M−N) pieces of delay elements (D) 132-1, 132-2, . . . , 132-(M−N) are connected in series (FIG. 13 is shown as M=6, N=4 for simplifying the drawing). Each delay element has delay time "D" corresponding to a sampling period, respectively.

Here, when a sampling time is "n" and the received signal at the time "n" is "u(n)", time-series FF input data for the tap number N, namely, u(n), u(n−1), . . . , u(n−N+1) can be obtained. When the reference signal which has been already included in the adaptive equalization unit is d(n), time-series reference data for the FB tap number (M−N), namely, d(n−1), . . . , d(n−(M−N)) can be obtained. The reference signal d(n) corresponds to a pattern in which "0xB24D" is Manchester encoded.

The multipliers 133-1, 133-2, . . . , 133-N as many as the FF tap number N as well as the multipliers 134-1, . . . , 134-(M−N) as many as the FB tap number (M−N) included in a first multiplier group have tap coefficients $w^+_1(n)$, $w^+_2(n)$, . . . , $w^+_M(n)$ respectively, which corresponds to transient response characteristics in the direction in which load resistance of the antenna is turned on from off, performing weighted multiplication of time-series input data u(n), u(n−1), . . . , u(n−N+1) and time-series reference data d(n−1), . . . , d(n−(M−N)). On the other hand, multipliers 135-1, 135-2, . . . , 135-N as many as the FF tap number N as well as 136-1, . . . , 136-(M−N) as many as the FB tap number (M−N) included in a second multiplier group have tap coefficients $w^-_1(n)$, $w^-_2(n)$, . . . , $w^-_M(n)$ respectively, which corresponds to transient response characteristics in the direction in which load resistance of the antenna is turned off from on, performing weighted multiplication of time-series input data u(n), u(n−1), . . . , u(n−N+1) and time-series reference data d(n−1), . . . , d(n−(M−N)).

Each selector 137-i outputs a multiplication result with respect to any one of $w_i^+(n)$ and $w_i^-(n)$ selectively according to the change direction of the electrical load, in other words, according to positive and negative signs of the input data u(n−i+1) when "i"≦N, and according to positive and negative signs of the input data u(n−i+N) when "i"≧N.

An accumulator 138 adds and averages the time-series input data which have been weighted by corresponding tap coefficients respectively to obtain an equalized output signal "r(n)" at the time "n". The above equalization processing can be represented as the following formula (7).

$$u^T(n) = [u(n), u(n-1), \ldots , \qquad (7)$$
$$u(n-N+1), d(n-1), \ldots , d(n-M+N)]$$
$$= [u_0(n), u_0(n-1), \ldots , u_0(n-M+1)]$$
$$w^{+T}(n) = [w_1^+(n), w_2^+(n), w_3^+(n), \ldots , w_M^+(n)]$$
$$w^{-T}(n) = [w_1^-(n), w_2^-(n), w_3^-(n), \ldots , w_M^-(n)]$$
$$w^T(n) = [w_1(n), w_2(n), w_3(n), \ldots , w_M(n)]$$
$$w_i(n) = \begin{cases} w_i^+(n) & \text{(if } u_0(n-i+1) \geq 0) \\ w_i^-(n) & \text{(if } u_0(n-i+1) < 0) \end{cases} \quad i = 1, 2, \ldots , M$$
$$r(n) = w^H(n) \cdot u(n)$$

A reference signal d(n) is inputted to an adder 139 with the equalized output signal r(n), and an error signal e(n) which is the difference there between is outputted. The reference signal d(n) corresponds to a pattern in which "0xB24D" is Manchester encoded, which have been previously included in the adaptive equalization unit.

When the time-series input data u(n), u(n−1), . . . , u(n−N+1), time-series reference data d(n−1), . . . , d(n−(M−N)) at the time "n" and the error signal e(n) are inputted, a learning circuit 140 determines tap coefficients $w^+_1(n+1)$, $w^+_2(n+1)$, . . . , $w^+_M(n+1)$ of the first multiplier group as well as tap coefficients $w^-_1(n+1)$, $w^-_2(n+1)$, . . . , $w^-_M(n+1)$ of the second multiplier group at the next time by using the NLMS algorithm so that the equalized output signal "r" from the FIR filter comes close to the reference signal "d", supplying them to multipliers in respective multiplier groups. Update formulas of the error signal e(n) and the tap coefficients are represented as the following formula (8). The update of tap coefficients is performed only to tap coefficients selected by the selectors 137, and tap coefficients which have not been selected are not updated.

$$e(n) = d(n) - r(n) \qquad (8)$$
$$w(n+1) = w(n) + \frac{\alpha \cdot u(n)}{\|u(n)\|^2} \cdot e^*(n)$$

The update formulas shown in the above formula (8) are repeatedly performed, as a result, respective tap coefficients $w^+_1(n)$, $w^+_2(n)$, . . . , $w^+_M(n)$ as well as $w^-_1(n)$, $w^-_2(n)$, . . . , $w^-_M(n)$ are converged so as to reduce the error signal e(n).

"α" in the above formula (8) represents the step size, and 0<α<2. When "α" is close to "1", convergence is performed at high speed, however, the variation of error is increased. When "α" is close to "0", convergence is performed slowly, however, the variation of error is reduced. The learning circuit 140 sets the step size α to a value close to "1" in the front half of the sync part to thereby perform high-speed learning while permitting variation of error. In the following last half of the sync part, the learning circuit 140 sets the step size α to a value close to "0" to thereby perform lower-speed learning to reduce variation of error. Accordingly, the learning circuit 140 realizes learning of adaptive equalization with high-speed convergence and small convergence error on the whole (the same as the above).

In the learning circuit 140, it is also preferable that last several symbols of the preamble part and the sync part are used at the same time (refer to FIG. 14) instead of using only the sync part as the known signal series to thereby perform learning using the longer known signal series (the same as the above). Moreover, a transmission waveform obtained from the equalized data part is used as a reference signal as shown in FIG. 7 and FIG. 8 and the learning is continued also at the data part, thereby performing learning using the longer signal series.

In the specification, embodiments applied to the contactless communication system complying with the NFC IP-1 standard have been chiefly explained, however, the embodiments may be similarly applied to communication systems complying with various standards in which communication is performed using modulation by switching the change direction of electrical load.

It should be understood that various changes and modifications to the presently preferred embodiments described herein will be apparent to those skilled in the art. Such changes and modifications can be made without departing from the spirit and scope of the present subject matter and The invention is claimed as follows:

1. A communication device for receiving a packet including a preamble part having a continuous waveform, a sync part having a specific pattern and a data part, which has been modulated by changing electrical load, the communication device comprising:
   a preamble detection unit configured to detect the preamble part from a received signal to extract sampling timing based on the continuous waveform;
   a sync detection unit configured to detect the sync part from the received signal based on the sampling timing to output a timing signal indicating a start position of the sync part;
   a delay buffer configured to give a delay to the received signal so that the head of the sync part is not outputted until the sync detection unit determines the detection of the sync part;
   an adaptive equalization unit configured to perform adaptive equalization using the sync part based on the timing signal by inputting the received signal delayed by the delay buffer; and
   a decoding unit configured to perform decoding processing of an equalized output signal from the adaptive equalization unit,
   wherein the adaptive equalization unit is a learning-type equalization circuit including a FIR (Finite Impulse Response) filter and a learning circuit, which adjusts tap coefficients of the FIR filter by comparing the received signal to a given reference signal based on the timing signal so that the difference therebetween is reduced.

2. The communication device according to claim 1, wherein the learning circuit applies any of learning algorithms of NLMS (Normalized Least Mean Square), LMS (Least Mean Square) and RLS (Recursive Least Square).

3. The communication device according to claim 1, wherein the learning circuit performs high-speed learning while permitting variation of error in the front half of the sync part as well as performs low-speed learning with small convergence error by suppressing variation of error in the last half of the sync part.

4. The communication device according to claim 1, wherein the FIR filter includes
   a delay line in which plural delay elements having delay time corresponding to a sampling period respectively are connected in series;
   first multipliers for performing multiplication of first type of tap coefficients corresponding to a first change direction of electrical load and second multipliers performing multiplication of second type of tap coefficients corresponding to a second change direction of electrical load respectively with respect to the transmission signal inputted to the delay line as well as time-series input data including output signals from respective delay elements of the delay line,
   selectors for selecting any one of outputs from the first multipliers and the second multipliers by each input data according to the change direction, namely, positive/negative sign of input data of electrical load, and
   an accumulator for adding and averaging weighted time-series input data selected by the selectors to output an equalized signal, and
   the learning circuit adjusts tap coefficients selected by the selectors so that the difference between the received signal and the reference signal is reduced.

5. A communication device for receiving a packet including a preamble part having a continuous waveform, a sync part having a specific pattern and a data part, which has been modulated by changing electrical load, the communication device comprising:
   a preamble detection unit configured to detect the preamble part from a received signal to extract sampling timing based on the continuous waveform;
   a sync detection unit configured to detect the sync part from the received signal based on the sampling timing to output a timing signal indicating a start position of the sync part;
   a delay buffer configured to give a delay to the received signal so that the head of the sync part is not outputted until the sync detection unit determines the detection of the sync part;
   an adaptive equalization unit configured to perform adaptive equalization using the sync part based on the timing signal by inputting the received signal delayed by the delay buffer; and
   a decoding unit configured to perform decoding processing of an equalized output signal from the adaptive equalization unit,
   wherein the adaptive equalization unit is a learning-type equalization circuit including a DFE (Decision Feedback Equalizer) and a learning circuit, which adjusts tap coefficients of the DFE by comparing the received signal to a given reference signal based on the timing signal so that the difference therebetween is reduced.

6. The communication device according to claim 2, wherein the learning circuit applies any of learning algorithms of NLMS (Normalized Least Mean Square), LMS (Least Mean Square) and RLS (Recursive Least Square).

7. The communication device according to claim 2, wherein the learning circuit performs high-speed learning while permitting variation of error in the front half of the sync part as well as performs low-speed learning with small convergence error by suppressing variation of error in the last half of the sync part.

8. The communication device according to claim 2, wherein the DFE includes
   a feedforward delay line in which plural delay elements having delay time corresponding to a sampling period respectively, to which the transmission signal is inputted, are connected in series,
   a feedback delay line in which plural delay elements having delay time corresponding to a sampling period respectively, to which a reference signal for learning is inputted,
   first multipliers for performing multiplication of first type of tap coefficients corresponding to a first change direction of electrical load and second multipliers performing multiplication of second type of tap coefficients corresponding to a second change direction of electrical load respectively with respect to the transmission signal and time-series input data including output signals of respective delay elements in the feedforward delay line as well as time-series feedback data having output signals of respective delay elements in the feedback delay line, and
   selectors for selecting any one of outputs from the first multipliers and the second multipliers by each input data and feedback data according to the change direction, namely, positive/negative sign of input data or feedback data of electrical load, and the learning circuit adjusts tap coefficients selected by the selector so that the difference between the received signal and the reference signal is reduced.

9. A communication device for receiving a packet including a preamble part having a continuous waveform, a sync part having a specific pattern and a data part, which has been modulated by changing electrical load, the communication device comprising:

a preamble detection unit configured to detect the preamble part from a received signal to extract sampling timing based on the continuous waveform;

a sync detection unit configured to detect the sync part from the received signal based on the sampling timing to output a timing signal indicating a start position of the sync part;

a delay buffer configured to give a delay to the received signal so that the head of the sync part is not outputted until the sync detection unit determines the detection of the sync part;

an adaptive equalization unit configured to perform adaptive equalization using the sync part based on the timing signal by inputting the received signal delayed by the delay buffer; and a decoding unit configured to perform decoding processing of an equalized output signal from the adaptive equalization unit, wherein the adaptive equalization unit performs learning using a longer known signal series by using the last several symbols of the preamble part and the sync part at the same time.

10. The communication device according to claim 9, wherein the adaptive equalization unit stops learning at the timing when the data part following the sync part is outputted.

11. A communication device for receiving a packet including a preamble part having a continuous waveform, a sync part having a specific pattern and a data part, which has been modulated by changing electrical load, the communication device comprising:

a preamble detection unit configured to detect the preamble part from a received signal to extract sampling timing based on the continuous waveform;

a sync detection unit configured to detect the sync part from the received signal based on the sampling timing to output a timing signal indicating a start position of the sync part;

a delay buffer configured to give a delay to the received signal so that the head of the sync part is not outputted until the sync detection unit determines the detection of the sync part;

an adaptive equalization unit configured to perform adaptive equalization using the sync part based on the timing signal by inputting the received signal delayed by the delay buffer;

a decoding unit configured to perform decoding processing of an equalized output signal from the adaptive equalization unit; and a data part reference signal generating unit generating a data part reference signal from a transmission waveform obtained from the data part equalized at the adaptive equalization unit, wherein the adaptive equalization unit performs low-speed learning at the data part continuously by using the data unit reference signal.

12. The communication device according to claim 11, wherein the data part reference signal generating unit is a temporary determination unit to which the data part equalized at the adaptive equalization unit is inputted and performs temporary determination of the transmission waveform based on a sign of the input signal, and the adaptive equalization unit uses a temporary determination output from the temporary determination unit as a reference signal at the time of performing learning at the data part.

13. The communication device according to claim 11, wherein the data part reference signal generating unit is a re-encoding unit which performs re-encoding of a decoded signal obtained by decoding the data part equalized at the adaptive equalization unit at the decoding unit, and the adaptive equalization unit uses a signal series re-encoded at the re-encoding unit as a reference signal at the time of performing learning at the data part.

14. A communication method for receiving a packet including a preamble part having a continuous waveform, a sync part having a specific pattern and a data part, which have been modulated by changing electrical load, the method comprising:

detecting the preamble part from a received signal and extracting sampling timing based on the continuous waveform;

detecting the sync part from the received signal based on the sampling timing and outputting a timing signal indicating a start position of the sync part;

giving and holding a delay with respect to the received signal so that the head of the sync part is not outputted until the detection of the sync part is determined in the step of detecting the sync;

performing adaptive equalization using the sync part based on the timing signal by inputting the received signal delayed by the delay holding step;

performing decoding processing of an equalized output signal obtained by the adaptive equalization step; and performing learning using a longer known signal series by using the last several symbols of the preamble part and the sync part at the same time.

15. A non-transitory computer-readable medium storing a computer program product that when executed by a processor performs steps for receiving a packet including a preamble part having a continuous waveform, a sync part having a specific pattern and a data part, which have been modulated by changing electrical load, allowing a computer to function as a preamble detection unit configured to detect the preamble part from a received signal to extract sampling timing based on the continuous waveform;

a sync detection unit configured to detect the sync part from the received signal based on the sampling timing to output a timing signal indicating a start position of the sync part;

a delay buffer configured to give delay to the received signal so that the head of the sync part is not outputted until the sync detection unit determines the detection of the sync part;

an adaptive equalization unit configured to perform adaptive equalization using the sync part based on the timing signal by inputting the received signal delayed by the delay buffer; and a decoding unit configured to perform decoding processing of an equalized output signal from the adaptive equalization unit
wherein the adaptive equalization unit is configured to perform learning using a longer known signal series by using the last several symbols of the preamble part and the sync part at the same time.

16. An adaptive equalizer for performing equalization processing of a transmission signal modulated by changing electrical load, comprising:
- a delay line in which plural delay elements having delay time corresponding to a sampling period respectively are connected in series;
- first multipliers for performing multiplication of first type of tap coefficients corresponding to a first change direction of electrical load and second multipliers for performing multiplication of second type of tap coefficients corresponding to a second change direction of electrical load respectively with respect to the transmission signal inputted to the delay line as well as time-series input data including output signals from respective delay elements of the delay line;
- selectors for selecting any one of outputs from the first multipliers and the second multipliers by each input data according to the change direction, namely, positive/negative sign of input data of electrical load,
- an accumulator for adding and averaging weighted time-series input data selected by the selectors to output an equalized signal; and
- a learning circuit adjusting tap coefficients selected by the selectors so that the difference between a received signal and a reference signal is reduced.

17. An adaptive equalizer for performing equalization processing of a transmission signal modulated by changing an electrical load, the adaptive equalizer comprising:
- a feedforward delay line in which plural delay elements having a delay time corresponding to a sampling period respectively to which the transmission signal is inputted are connected in series;
- a feedback delay line in which plural delay elements having a delay time corresponding to a sampling period respectively to which a reference signal for learning is inputted;
- first multipliers for performing multiplication of first type of tap coefficients corresponding to a first change direction of electrical load and second multipliers for performing multiplication of second type of tap coefficients corresponding to a second change direction of electrical load respectively with respect to time-series input data including the transmission signal and output signals of respective delay elements in the feedforward delay line as well as time-series feedback data having output signals of respective delay elements in the feedback delay line;
- selectors for selecting any one of outputs from the first multipliers and the second multipliers by each input data and feedback data according to the change direction, namely, positive/negative sign of input data or feedback data, of an electrical load; and
- a learning circuit adjusting tap coefficients selected by the selectors so that the difference between a received signal and a reference signal is reduced.

* * * * *